(12) United States Patent
Edwards et al.

(10) Patent No.: US 12,249,865 B2
(45) Date of Patent: Mar. 11, 2025

(54) MODULAR EMERGENCY BATTERY

(71) Applicant: Wangs Alliance Corporation, Port Washington, NY (US)

(72) Inventors: Dimauro Andrade Edwards, Jamaica, NY (US); Qianxiang Wang, Great Neck, NY (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 18/785,450

(22) Filed: Jul. 26, 2024

(65) Prior Publication Data

US 2025/0038568 A1 Jan. 30, 2025

Related U.S. Application Data

(60) Provisional application No. 63/532,544, filed on Aug. 14, 2023, provisional application No. 63/529,006, filed on Jul. 26, 2023.

(51) Int. Cl.
*H02J 9/06* (2006.01)
*F21V 23/00* (2015.01)
*H05B 45/50* (2022.01)

(52) U.S. Cl.
CPC ............ *H02J 9/065* (2013.01); *F21V 23/003* (2013.01); *H05B 45/50* (2020.01)

(58) Field of Classification Search
None
See application file for complete search history.

(56) References Cited

U.S. PATENT DOCUMENTS

| | | | |
|---|---|---|---|
| 11,310,880 B2 * | 4/2022 | Ramaiah | H02J 7/0047 |
| 2015/0130282 A1 * | 5/2015 | Mishra | H05B 47/115 |
| | | | 315/86 |
| 2017/0051886 A1 * | 2/2017 | Liu | H05B 47/105 |
| 2017/0310157 A1 * | 10/2017 | Cannon | H02J 7/0013 |
| 2020/0196419 A1 * | 6/2020 | Johnson | H02J 7/0068 |

OTHER PUBLICATIONS

"XAL Move It Pro System," xal.com/moveitpro, Retrieved on Jun. 16, 2024.

* cited by examiner

*Primary Examiner* — Anh Q Tran
(74) *Attorney, Agent, or Firm* — Weiss & Arons LLP

(57) ABSTRACT

Methods, apparatus and systems for emergency lighting. The apparatus may include a microprocessor. The microprocessor may power a plurality of fixtures. The plurality of fixtures may be supported in a fixture support. The microprocessor may be electrically connected with a remote emergency battery via a control line. In response to a loss of power at the microprocessor, an emergency lighting protocol may be activated. The emergency lighting protocol may retrieve a pointer to a designated fixture in the plurality of fixtures. The emergency lighting protocol may provide power to the designated fixture using power received from the emergency battery.

27 Claims, 15 Drawing Sheets

MODULAR EMERGENCY BATTERY

CROSS-REFERENCE TO RELATED APPLICATIONS

This application is a nonprovisional of U.S. Provisional Applications Nos. 63/529,006, filed Jul. 26, 2023, and 63/532,544, filed on Aug. 14, 2023, which are hereby incorporated by reference herein in their entireties.

BACKGROUND

General fire safety, along with various building safety codes, requires emergency lighting in buildings and other areas. For example, the National Fire Protection Association (NFPA) requires emergency lighting as part of buildings safety codes, NFPA 101®, Life Safety Code®. The Life Safety Code® requires emergency lighting to be provided in designated exit areas in commercial buildings or residences. The emergency lighting is required to automatically provide light for at least 90 minutes when there is a loss of line power.

Currently, solutions for emergency lighting within regular lighting systems include bug-eye lights connected to exit signs. The bug-eye lights may turn on and provide illumination using power from their integral batteries when there is a loss of power.

For modular lighting systems, current solutions include attaching a generator to one or more tracks included in the modular lighting system. Current systems include a wire designated for emergency lighting. When the wire designated for emergency lighting loses power, the emergency lighting is triggered.

It would therefore be desirable to provide emergency lighting for modular lighting systems.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

Figure 1:
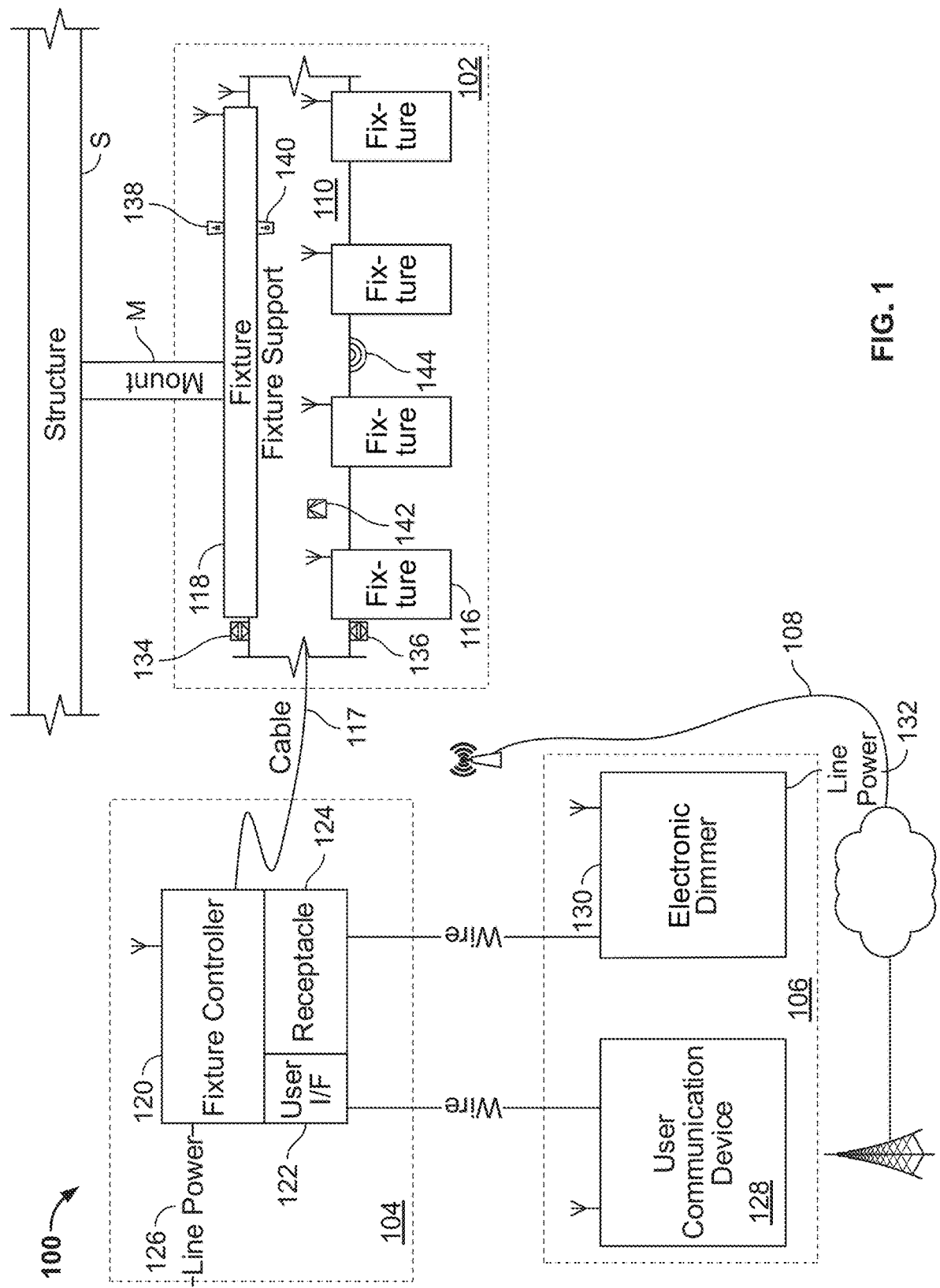
FIG. 1 shows schematically illustrative apparatus in accordance with the principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for emergency lighting are provided.

The apparatus may include a microprocessor. The microprocessor may include a central processing unit ("CPU"). The microprocessor may include any suitable processor.

The microprocessor may control a fixture. The microprocessor may control a plurality of fixtures. Each of the plurality of fixtures may be supported in a fixture support. Each of the plurality of fixtures may be engaged with the fixture support by a mechanical support, a magnetic support, an electrical support, any suitable support or any combination thereof.

Each of the plurality of fixtures may include one or more light sources. Light sources may include light emitting diodes ("LEDs"), fluorescent lights, incandescent lights, halogen lights, organic LEDs ("OLEDs"), or any other suitable light sources. Each of the plurality of fixtures may include a base. Each base may include contacts. The contacts may be electrical contacts. The contacts may contact the fixture support when the fixtures are engaged with the fixture support. The contacts may enable the microprocessor to be in electronic communication with the plurality of fixtures. The contacts may enable the microprocessor to provide power to the plurality of fixtures.

The fixture support may be a first a fixture support. A first fixture may receive power from the first fixture support. A second fixture may receive power from a second fixture support. The second fixture may have one or more features in common with the first fixture support. The microprocessor may be in electronic communication with the second fixture support. The microprocessor may be in electronic communication with a plurality of fixture supports. The microprocessor may provide power to the plurality of fixture supports. The microprocessor may be disposed remotely from the fixture supports. The microprocessor may be disposed in or on one of the fixture supports. Different fixtures of the plurality of fixtures may be supported by different fixture supports.

The microprocessor may be electrically connected with an emergency battery. The emergency battery may be a remote emergency battery. The remote emergency battery may be disposed remotely from the microprocessor. The remote emergency battery may be disposed remotely from the plurality of fixture supports. The remote emergency battery may be in electronic communication with the microprocessor via a control line. The control line may be a 0-10V control line. The control line may be any suitable control line.

The microprocessor may activate an emergency lighting protocol. The microprocessor may activate the emergency lighting protocol in response to a loss of power at the microprocessor. The microprocessor may be powered via line voltage. The line voltage may have a voltage of 120

VAC. The line voltage may have a voltage of 220 VAC. The line voltage may have any other suitable voltage. In response to a detection of a loss of line voltage at the microprocessor, the microprocessor may activate the emergency lighting protocol. The emergency battery may detect a loss of line voltage at the microprocessor via the control line. In response to detecting a loss of line voltage, the emergency battery may activate the emergency lighting protocol in the microcontroller.

The emergency lighting protocol may include any suitable protocol. The emergency lighting protocol may include any suitable algorithm.

The emergency lighting protocol may be stored in the microprocessor. The emergency lighting protocol may be stored in a memory location that is in electronic communication with the microprocessor. The memory location may include a read-only memory location, a random-access memory location, a flash memory location, cache memory location, a cloud-based memory location and/or any other suitable memory location.

The emergency lighting protocol may retrieve a pointer. The pointer may be a digital pointer. The digital pointer may point to an address of a designated fixture from the plurality of fixtures. The designated fixture may be a fixture designated for emergency lighting. The designated fixture may include the microprocessor. The designated fixture may not include the microprocessor.

The designated fixture may be a preset designated fixture. The designated fixture may be a factory-set designated fixture. The designated fixture may be designated by a user. The user may designate the fixture by selecting the fixture from the plurality of fixtures. The selection may be a manual selection. The manual selection may include designating a fixture as a designated fixture by pressing a button, switching a switch or any other suitable manual selectors. The selection may be a software selection. The selection may be a remote selection. The selection may be a wireless selection. The selection may include any suitable selection.

The user may select the designated fixture via a software application. The software application may be displayed on a graphical user interface ("GUI"). The software application may be executed on a mobile device, dedicated lighting controller or any other suitable computing device. The software application may include a plurality of modes. The software application may include an emergency mode. The emergency mode may enable the user to select which fixtures from the plurality of fixtures to select as designated fixtures for emergency lighting. Each of the plurality of fixtures may be programmable. Each of the plurality of fixtures may be programmable to be a designated fixture. Selection of a designated fixture may include programming the designated fixture to receive emergency power when the emergency lighting protocol is activated. The user may undesignate a designated fixture. Undesignating a fixture may include changing the designation of a fixture from a designated fixture to a non-designated fixture. A non-designated fixture may be a fixture that does not receive emergency power when the emergency lighting protocol is activated. A non-designated fixture may be a fixture that does not receive emergency power when there is a loss of line voltage.

The designated fixture may receive power in a non-emergency condition. The designated fixture may receive power in an emergency condition. A non-designated fixture may receive power in a non-emergency condition. A non-designated fixture may not receive power in an emergency condition.

The microprocessor may create a digital pointer in response to receiving a selection of a fixture as a designated fixture from a user. The digital pointer may include an address of the designated fixture. The digital pointer may include any other suitable identifier for the fixture. The digital pointer may instruct the emergency battery to supply emergency power to the designated fixture.

The emergency lighting protocol may use power received from the remote emergency battery. The emergency lighting protocol may direct power to the designated fixture. The emergency lighting protocol may determine how much power to provide to the designated fixture. The amount of power provided to the designated fixture from the emergency battery may be less power than the amount of power provided to the designated fixture in a non-emergency condition.

A single fixture may be selected as a designated fixture. More than one fixture may be selected as a designated fixture. Any suitable number of fixtures may be selected as designated fixtures. A first designated fixture may be supported by the first fixture support. A second designated fixture may be supported by a second fixture support. Any designated fixture may be supported by a corresponding fixture support.

The emergency lighting protocol may retrieve a digital pointer corresponding to all of the designated fixtures. The emergency lighting protocol may retrieve a first digital pointer corresponding to the first designated fixture. The emergency lighting protocol may retrieve a second digital pointer corresponding to the second designated fixture. The emergency lighting protocol may retrieve one or more digital pointers, each digital pointer may correspond to a designated fixture. The emergency lighting protocol may retrieve the one or more digital pointers via parallel retrieval, via serial retrieval or via any suitable combination thereof.

The one or more digital pointers may be included in a single data structure. The data structure may be transmitted from the software application to the microprocessor. The data structure may be transmitted in response to a first selection of designated fixtures from the user. The data structure may be updated in response to a second selection of designated fixtures from the user. The second selection may designate different fixtures than the first selection. The second selection may designate some of the same fixtures and some different fixtures than the first selection. The data structure may be stored in the microprocessor. The data structure may be stored in the memory location that is in electronic communication with the microprocessor.

The emergency lighting protocol may provide power to the one or more designated fixtures. The emergency lighting protocol may distribute the power received from the remote emergency battery between the first designated fixture and the second designated fixture. The emergency lighting protocol may distribute the power received from the remote emergency battery to all the designated fixtures in accordance with a predetermined distribution. The emergency lighting protocol may provide a different amount of power to each designated fixture. The emergency lighting protocol may provide the same amount of power to each designated fixture. The emergency lighting protocol may provide an amount of power to each designated fixture based on a power usage metric for each fixture. The emergency lighting protocol may calculate the power usage metric for each fixture. The power usage metric may be an amount of power that is consumed by a light a fixture. The emergency lighting protocol may provide any suitable amount of power to each designated fixture based on any suitable metric.

The emergency lighting protocol may be configured to transmit power to the one or more designated fixtures for a predetermined amount of time. The predetermined amount of time may be user selectable. The predetermined amount of time may be a factory set amount of time. Table 1 lists illustrative ranges that may include the predetermined amount of time.

TABLE 1

Illustrative time ranges.
Illustrative time ranges
(minutes)

| Lower | Upper |
|---|---|
| 0 | 10 |
| 20 | 30 |
| 30 | 40 |
| 40 | 50 |
| 50 | 60 |
| 60 | 70 |
| 70 | 80 |
| 80 | 90 |
| 90 | 100 |
| 100 | 120 |
| 120 | >120 |
| Other suitable lower limits | Other suitable upper limits |

Upon receiving power from the emergency battery, each of the designated fixtures may emit light. The light may have a brightness. The brightness may be any suitable brightness that conforms to the NFPA 101®, Life Safety Code® standards. The user may select a color correlated temperature ("CCT") for the light emitted from each designated fixture. The user may select any other suitable fixture parameters.

The designated lighting fixture may be an emergency lighting fixture. The emergency lighting fixture may include one or more light sources. The one or more light sources may be LED light sources. The LED light sources may include a CCT. The LED light sources may include a mixture of more than one CCT. Table 2 lists illustrative ranges that may include nominal CCT values.

TABLE 2

Illustrative ranges that may include nominal CCT values.
Illustrative Ranges (° K)

| Lower | Upper |
|---|---|
| <1,800 | 1,800 |
| 1,800 | 2,700 |
| 2,700 | 3,500 |
| 3,500 | 5,000 |
| 5,000 | 6,500 |
| 6,500 | >6,500 |
| Other suitable ranges | |

The emergency lighting fixture may be supported by the fixture support.

The emergency lighting fixture may receive a first voltage. The first voltage may have a first power. The emergency lighting fixture may receive the first power in a first state. The emergency lighting fixture may receive a second voltage. The second voltage may have a second power. The emergency lighting fixture may receive the second power in a second state. Table 3 lists illustrative ranges that may include the first voltage and the second voltage.

TABLE 3

Illustrative voltage ranges.
Illustrative voltage ranges
(DC Volts)

| Lower | Upper |
|---|---|
| 0 | 10 |
| 20 | 30 |
| 30 | 40 |
| 40 | 50 |
| 50 | >50 |
| Other suitable lower limits | Other suitable upper limits |

Table 4 lists illustrative ranges that may include the first power and the second power.

TABLE 4

Illustrative power ranges.
Illustrative power ranges
(kW)

| Lower | Upper |
|---|---|
| 0 | 5 |
| 5 | 10 |
| 10 | 15 |
| 15 | 20 |
| 20 | >20 |
| Other suitable lower limits | Other suitable upper limits |

The first power may be sourced from line voltage. The second power may be sourced from the remote emergency battery. The second state may be activated by the microprocessor. The second state may be activated by the microprocessor in response to a detection of a loss of line voltage at the microprocessor. The second state may be activated by the emergency lighting protocol. The second state may be activated by the emergency battery. The second voltage may be a lower voltage than the first voltage. The second power may be a lower power than the first power.

The microprocessor may be disposed in the emergency lighting fixture. The microprocessor may be disposed remote from the emergency lighting fixture.

The emergency lighting fixture may be programmed via the software application to be configured to receive power in the second state. The emergency lighting fixture may be selected via a user selection from the plurality of fixtures supported by the fixture support.

The emergency lighting fixture may include an LED driver. The LED driver may transmit power and data to the LED light source. The LED light source may receive the power and the data from the microprocessor.

The emergency lighting fixture may include an emergency battery. The emergency battery may be disposed inside the emergency lighting fixture. The emergency lighting fixture may include an emergency driver. The emergency driver may include a microcontroller. The microcontroller may detect a loss of power at the emergency lighting fixture. In response to the loss, the emergency driver may transmit power from the emergency battery to the LED light source. The power may be transmitted in such a way that the power bypasses the LED driver. The microcontroller may determine an amount of power to be transmitted from the emergency battery to the LED light source. The microcontroller may include the emergency protocol.

The emergency driver may be a driver that is different from the LED driver. The emergency driver may be a driver that is the same as the LED driver.

Power transmitted from the emergency driver may be a lower power than that transmitted from the LED driver.

The emergency lighting fixture may be a fixture that is not removeable from the fixture support. The emergency lighting fixture may be a fixture that is removeable from the fixture support.

The emergency lighting fixture may include an emergency power conditioner. The emergency power conditioner may have one or more features in common with the emergency driver. Voltage and data from the microprocessor may be transmitted through the emergency power conditioner to the LED driver. In response to detecting the loss of power, the emergency battery may provide power to the emergency power conditioner. The emergency power conditioner may condition the power received from the emergency battery. The power may be transmitted through the emergency power conditioner to the LED driver. The LED driver may provide the power to the one or more LED light sources.

In some embodiments, the apparatus may include an emergency battery. The emergency battery may be a rechargeable emergency battery. The rechargeable emergency battery may include a test button. The test button may be used to test the functionality of the emergency battery. The test button may be used to test if the emergency battery is charged. The test button may include an indicator light. The indicator light may include an LED. The indicator light may indicate that the emergency battery is charged. The indicator light may indicate that the emergency battery is not charged.

The emergency battery may include an emergency driver. The emergency driver may include a microcontroller. The microcontroller may control the emergency battery. The microcontroller may include logic. The logic may control when to turn on the emergency battery. The logic may control when to turn off the emergency battery. The logic may control when to charge the emergency battery. The logic may control when to stop charging the emergency battery. The microcontroller may control any suitable controls of the emergency battery.

A track lighting system may include one or more light fixtures that may be placed into a fixture support. The fixture support may include a track. The track lighting system may be a modular lighting system. The one or more light fixtures may be modular light fixtures. Each of the one or more light fixtures may include a housing. The emergency battery may be placed in any of the one or more light fixture housings. The emergency battery may include a safety catch. The emergency battery may not be removable once placed in a light fixture housing, without the use of a tool. Absent of a tool, the emergency battery may not be releasable from the light fixture housing.

The track lighting system may include a central processing unit ("CPU"). The track lighting system may include an LED driver. The CPU may control the function of the LED driver. The LED driver may control the light output of LEDs included in the one or more light fixtures. The CPU may receive line voltage. The CPU may receive 120/277 VAC. The CPU may step down the voltage to 48 VDC. The track lighting system may receive an input of 48V DC. The CPU may require 48V to control the function of the LED driver. The microcontroller may detect a loss of voltage being transmitted to the CPU. In response to detecting a loss of voltage being transmitted to the CPU, the microcontroller may turn on the emergency battery.

The emergency battery may provide to the LED driver power to operate the LEDs included in the light fixture. The LED driver may include logic to determine which LEDs to illuminate for emergency lighting. The LED driver may include logic to determine at which intensity to illuminate the LEDs selected for emergency lighting.

The emergency battery may provide power directly to the LEDs included in the light fixture. The emergency battery may not provide power directly to the LEDs included in the light fixture. The emergency battery may provide power indirectly to the LEDs included in the light fixture. The emergency driver may include logic. The emergency driver may include logic to determine which LEDs to illuminate for emergency lighting. The emergency driver may include logic to determine at which intensity to illuminate the LEDs selected for emergency lighting.

The emergency driver may include a power conditioner. The power conditioner may power the LEDs included in the light fixture with the DC voltage. The power conditioner may include a mode switch. The mode switch may enable the power conditioner to charge the emergency battery when the CPU has power and is receiving line voltage. When a power loss is detected, the mode switch may enable a discharge state of the power conditioner. The power conditioner may send a data signal to the LEDs included in the light fixture. The data signal may tell the light fixture to reduce the amount of light emitted by the fixture. The power conditioner may receive power from the emergency battery.

The power conditioner may be used to transmit voltage and data from the CPU to the LED driver. The power conditioner may receive an input of 48 VDC or any other suitable voltage. The power conditioner may output 48 VDC or any other suitable voltage. The power conditioner may output DC voltage to the LED driver. The power conditioner may receive data from the CPU. The power conditioner may transmit the data to the LED driver. The power conditioner may step up the voltage to 48 VDC to compensate for a voltage drop.

The emergency battery, emergency driver, and the LED driver may be included in a single unit. The single unit may function as a driver. One or more of the emergency battery, emergency driver, and LED driver may be included in one or more of multiple units. The emergency battery may be disposed in a first position relative to the LED driver. The emergency driver may be disposed in a second position relative to the LED driver. The first position may be a different position from the second position. The emergency driver may be in electronic communication with the emergency battery. The emergency battery may include more than one unit. The more than one unit of the emergency battery may be disposed in any position relative to the LED and emergency drivers.

The emergency battery and emergency battery charger may be configured to fit in 24" fixture. The 24" fixture may include a cavity area of $6" \times 1\frac{3}{8}" \times \frac{1}{2}"$. The 24" fixture may include a first cavity. The 24" fixture may include a second cavity. Each of the first and second cavities may have a cavity area of $6" \times 1\frac{3}{8}" \times \frac{1}{2}"$. The emergency battery may be configured to fit into the first cavity. The emergency driver may be configured to fit into the second cavity.

The emergency battery and emergency battery charger may be configured to fit in 48" fixture. The 48" fixture may include a cavity area of $16" \times 1\frac{3}{8}" \times \frac{1}{2}"$. The 48" fixture may include a first cavity. The 48" fixture may include a first second cavity. Each of the first and second cavities may have a cavity area of 16"×1⅜"×½". The emergency battery may be configured to fit into the first cavity. The emergency driver may be configured to fit into the second cavity.

The emergency battery and emergency battery charger may be configured to fit in any suitable sized fixture. The fixture may include a cavity area of any suitable size. The fixture may include two cavities, a first and second cavity. Each of the first and second cavities may have a cavity area of any suitable size. The emergency battery may be configured to fit the first cavity. The emergency driver may be configured to fit the second cavity.

The emergency battery may be included in a remote battery pack. The remote battery pack may be located external of the one or more modular lighting fixture housings. The remote battery pack may include a housing. The remote battery pack may include an inverter. The remote battery pack may include the emergency battery. The emergency battery and the inverter may be disposed in the housing. The remote battery pack may include an inverter such as that available from Iota, Tucson, Arizona, under the name IIS 50 I Emergency Micro-Inverter.

The remote battery pack may be wired to the CPU. The remote battery pack may receive an input voltage of 120/277 VAC. The input voltage may be line voltage. When there is power, the remote battery pack may serve as a passthrough from the CPU to the LED driver. Serving as a passthrough the remote battery pack may output 120/277 VAC to the CPU. In the event of a power loss, the remote battery pack may power the CPU using the emergency battery. The emergency battery may output a DC voltage. The inverter may convert the DC voltage DC to an AC voltage. The remote battery pack may power the CPU with the AC voltage.

The remote battery pack may include the microcontroller. The remote battery pack may be in electronic communication with the LED driver. The remote battery pack may be in electronic communication with the LED driver via the microcontroller.

In an event of a power loss to the CPU, the remote battery pack may provide power to the CPU. The CPU may include an emergency lighting protocol. The emergency lighting protocol may select which fixtures to illuminate for emergency lighting. The emergency lighting protocol may include logic to select which fixtures to illuminate for emergency lighting. The emergency lighting protocol may select an intensity at which to illuminate the fixtures selected for emergency lighting. The emergency lighting protocol may use the microcontroller to select an intensity at which to illuminate the fixtures selected for emergency lighting.

Illustrative embodiments of apparatus and methods in accordance with the principles of the invention will now be described with reference to the accompanying drawings, which form a part hereof. It is to be understood that other embodiments may be utilized and that structural, functional and procedural modifications or omissions may be made without departing from the scope and spirit of the present invention.

Some embodiments may omit features shown and/or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus and/or some or all of the steps of the methods associated therewith.

FIG. 1 shows illustrative architecture 100 for controlling fixtures. Architecture 100 may include fixture arrangement 102. Architecture 100 may include fixture control module 104. Architecture 100 may include inputs 106. Architecture 100 may include wide area network 108. Architecture 100 may define one or more network segments. A first segment may include inputs 106. A second segment may include fixtures such as 116 and 118 in fixture arrangement 102.

A segment may include one or more individually addressable devices. A segment may include one or more addressable groups.

Fixture arrangement 102 may include fixture support 110. Fixture arrangement 102 may be supported by mount M. Mount M may fix fixture support 110 to structure S. Structure S may include a ceiling, a wall, a beam, cabinet, a free-standing object or any other suitable structure. Fixture support 110 may support one or more fixtures such as fixture 116. Fixture support 110 may support one or more fixtures such as fixture 118. One or more of fixtures 116 and 118 may be disposed on top of fixture support 110. One or more of fixtures 116 and 118 may be disposed on bottom of fixture support 110. One or more of fixtures 116 and 118 may be disposed on a side of fixture support 110. One or more of fixtures 116 and 118 may be disposed on an end of fixture support 110.

Fixture control module 104 may include fixture controller 120. Fixture control module 104 may include user interface 122. Fixture control module 104 may include receptacle 124. Fixture controller 120 may be in electrical communication with line power 126. Line power 126 may provide two-phase or three-phase power at 110 V or 220 V, DC voltage at any suitable level, or any other suitable voltage. Receptacle 124 may receive a dimmer voltage from electronic dimmer 130. Fixture 116 may operate over a range of operational levels. Fixture 116 may operate at a maximum operational level. The dimmer voltage may have a maximum voltage. A proportion of the maximum dimmer voltage that is represented by the dimmer voltage may correspond to an operational level at which a fixture 116 is to be operated. The dimmer voltage proportion, if applied to the maximum operational level, may define the operational level at which a fixture 116 is to be operated.

The operational level may be a power level, a current level, or any other suitable level.

Input 106 may include user communication device 128. Input 106 may include electronic dimmer 130.

Fixture controller 120 may be in wired electrical communication with fixture arrangement 102. The wired electrical communication may be provided by cable 117. The wired electrical communication may provide power to fixture arrangement 102. The wired electrical communication may provide control messages to fixture arrangement 102. Fixture controller 120 may provide the power and the control messages over different conductors. Fixture controller 120 may provide the power and the control messages simultaneously over a conductor, as is done in power line control methods.

Fixture controller 120 may be in wireless communication with fixture arrangement 102. The wireless electrical communication may provide control messages to fixture arrangement 102.

Communication between fixture controller 120 and fixture arrangement 102 may be wholly or in part by wired electrical communication. Communication between fixture controller 120 and fixture arrangement 102 may be wholly or in part by wireless electrical communication. Communication between fixture controller 120 and fixture arrangement 102 may be wholly or in part by wireless communication. The wireless communication may include optical communication. The wireless communication may include acoustic communication. Communication between fixture controller 120 and fixture arrangement 102 may be partially by wired electrical communication and partially wireless communication.

Fixture control module 104 may be in communication with input 106.

User interface 122 may provide communication functions for fixture control module 104. The communication may include transmission of a user command to fixture control module 104. The communication may include transmission of fixture information to input 106. The fixture information may include a fixture parameter. The communication may be wireless. The communication may be wired.

User interface 122 may receive a user command from communication device 128. User interface 122 may include a data input device. The data input device may include one or more of a touch screen, a key pad and any other suitable device. User interface 122 may receive a user command from communication device 128. Control over a fixture may be passed from user communication device 128 to user interface 122. Control over a fixture may be passed from user interface 122 to user communication device 128. The control may be passed by the user. The control may be configured to be passed automatically. The control may be configured to be passed automatically upon the fulfilment of a condition. The condition may be a temporal condition. The condition may be based on a fixture parameter. The condition may be based on an ambient lighting condition. The condition may be based on any suitable condition.

Electronic dimmer 130 may provide TRIAC/ELV dimming. Electronic dimmer 130 may receive electrical current from line power 132.

Architecture 100 may include one or more sensors. The sensors may include a range sensor such as 134 and 136. The range sensor may sense a distance to a surface. The sensors may include a temperature sensor such as 138 and 140. The temperature sensor may sense an ambient temperature. The temperature sensor may sense a temperature or a differential temperature of a surface at a distance from the sensor. The sensors may include a motion sensors such as 142. The sensors may include one or more light sensors such as 144. The light sensor may sense visible light. The light sensor may sense energy associated with one or more wavelengths of light.

Figure 2:
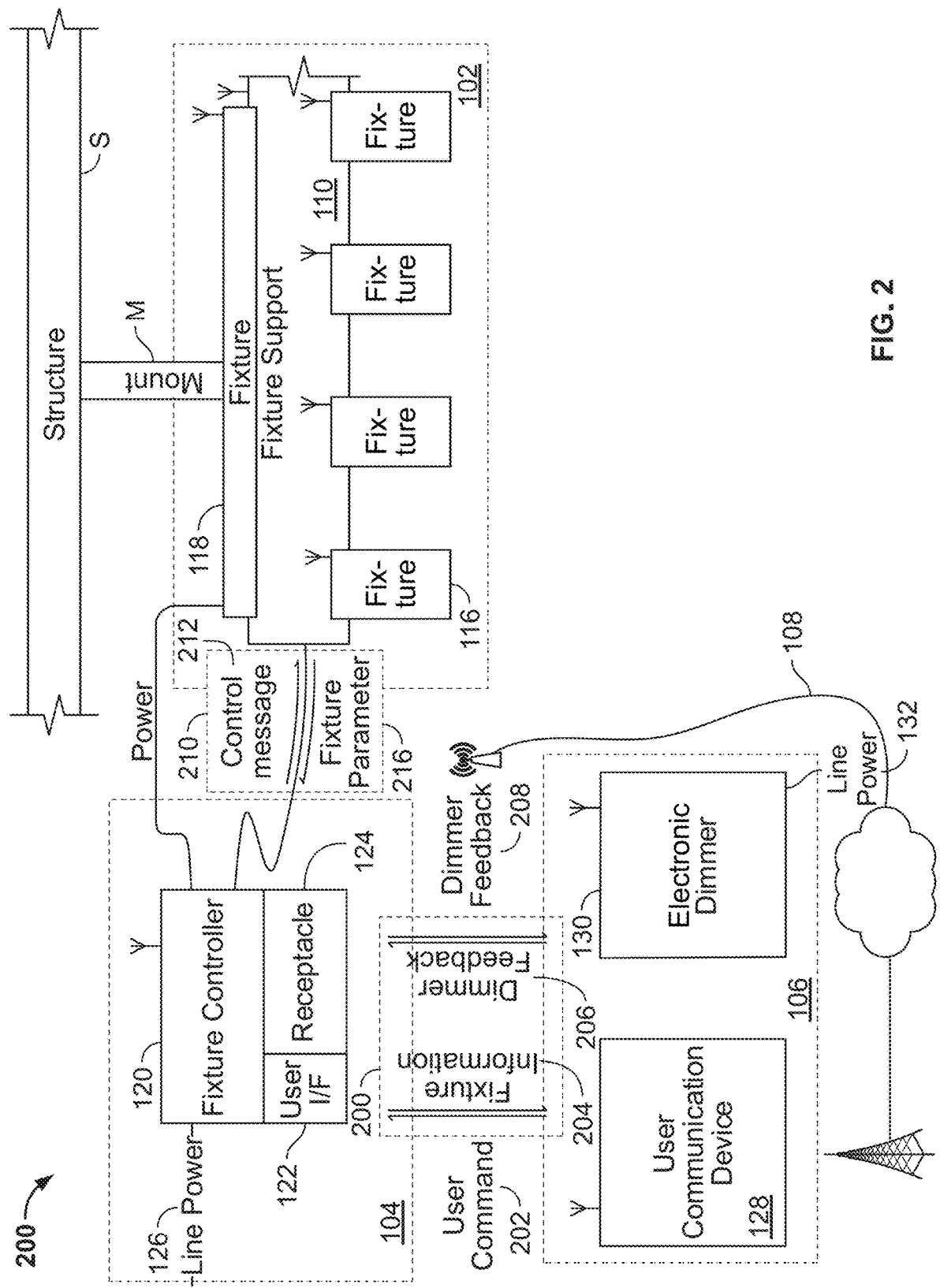
FIG. 2 shows schematically illustrative apparatus in accordance with the principles of the invention.

FIG. 2 shows illustrative communications 200 between fixture controller 120 and input 106. Illustrative communications 200 may include user command 202, fixture information 204, dimmer voltage 206, dimmer feedback 208 or any other suitable communication.

Illustrative communications 210 may be transmitted between fixture controller 120 and fixture arrangement 102. Communications 210 may include control messages 212 for control performance of fixtures such as 116. Communications 210 may include fixture parameter 216.

Figure 3:
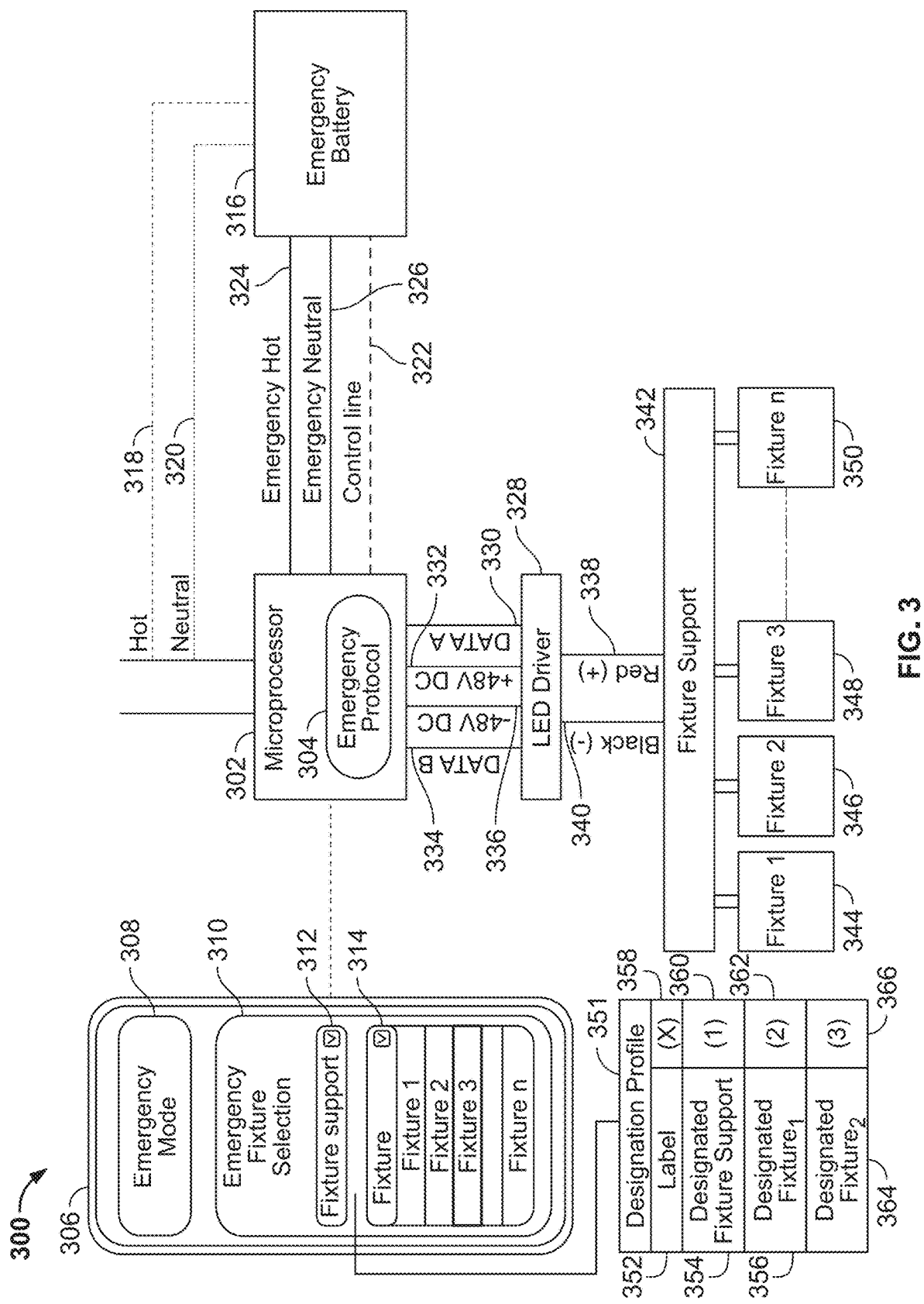
FIG. 3 shows schematically illustrative apparatus in accordance with the principles of the invention.

FIG. 3 shows illustrative emergency lighting assembly 300 for providing emergency lighting. Microprocessor 302 may receive line power via hot wire 318. Microprocessor 302 may receive line power via neutral wire 320. Hot wire 318 and neutral wire 320 may be connected to a power source, such as a power supply, a breaker panel, a transformer unit or any other suitable power supply (not shown). Hot wire 318 and neutral wire 320 may provide 120 VAC to microprocessor 302. Microprocessor 302 may provide data to LED driver 328 via data lines 330 and 334. Microprocessor 302 may convert the 120 VAC to 48 VDC. Microprocessor 302 may provide the 48 VDC to LED driver 328 via power lines 332 and 336.

LED driver 328 may power fixtures N, n=1 . . . . N such as fixtures 344, 346, 348 and 350. Fixtures 344, 346, 348 and 350 may have one or more features in common with fixtures 116 and 118. LED driver 328 may power fixtures 344, 346, 348 and 350 via fixture support 342. Fixture support 342 may have one or more features in common with fixture support 110. Fixtures 344, 346, 348 and 350 may include contacts. Fixture support 342 may include at least two power rails (not shown). The two power rails may receive power from LED driver 328 via power lines 338 and 340. The contact may contact the power rails. The contacts may receive the power from the power rails.

Microprocessor 302 may be in electronic communication with computing device 306. Computing device 306 may have one or more features in common with user interface 122 and user communication device 128. Computing device 306 may include one or more of mobile device, smartphone, tablet, controller interface or any other suitable computing device. Computing device 306 may execute a software application. The software application may include modes, such as mode 308.

Mode 308 may include an emergency mode. Mode 308 may be used when there is a loss of line power. Mode 308 may display configuration interface 310. Configuration interface 310 may be used to select emergency mode settings. Configuration interface 310 may include fixture support selection 312. Fixture support selection 312 may include a drop-down menu. The drop-down menu (not shown) may include a listing of all fixture supports that are configured to receive power from microprocessor 302. Fixture support selection 312 may include any selection display. Configuration interface 310 may include fixture selection 314. Fixture selection 314 may include a drop-down menu. The drop-down menu may include a listing of all fixtures connected to the selected fixture support. Fixture selection 314 may include any suitable selection display. Configuration interface 310 may include any other suitable emergency mode selection options.

Designation profile 351 may be created, through the software application, in response to a selection of one or more fixture supports and one or more fixtures. Designation profile 351 may include a digital pointer. Designation profile 351 may include a data structure.

Designation profile 351 may include label data 352. Label data 352 may include identifier 358, such as identifier X. Identifier 358 may include a binary identifier. Identifier 358 may be used to retrieve designation profile 351 when emergency protocol 304 is activated.

Designation profile 351 may include designated fixture support data 354. Designated fixture support data 354 may include designated fixture support selection 360. Designated fixture support selection 360 may include the one or more fixtures supports selected by a user, such as fixture support 1. Designated fixture support selection 360 may include one or more addresses corresponding to the one or more selected fixture supports. The one or more addresses may be any suitable fixture support addresses.

Designation profile 351 may include designated fixture data 356. Designated fixture data 356 may include designated fixture selection 362. Designated fixture selection 362 may include one or more fixtures selected by the user, such as designated fixture 2. Designated fixture selection 362 may include one or more addresses corresponding to the one or more selected fixtures. The one or more addresses may be any suitable fixture addresses.

Designation profile 351 may include designated fixture data 364. Designated fixture data 364 may include designated fixture selection 366. Designated fixture selection 366 may include one or more fixtures selected by the user, such as designated fixture 3. Designated fixture selection 366 may include one or more addresses corresponding to the one or more selected fixtures. The one or more addresses may be any suitable fixture addresses.

Designation profile 351 may include any other suitable data.

Designation profile 351 may be transmitted to microprocessor 302. Designation profile 351 may be transmitted to microprocessor 302 via any suitable analog or digital data transmission. Designation profile 351 may be stored in a memory location (not shown). The memory location may be in electronic communication with microprocessor 302.

Microprocessor 302 may be in electronic communication with emergency battery 316. Microprocessor 302 may be in electronic communication with emergency battery 316 via control line 322. Control line 322 may be a 0-10V control line. Control line 322 may be any suitable control line. Emergency battery 316 may be remote from microprocessor 302. Emergency battery 316 may be charged or recharged using line voltage received from hot wire 318 and neutral wire 320.

Emergency battery 316 may detect a loss of power provided to microprocessor 302 from hot wire 318 and neutral wire 320. Emergency battery 316 may detect the loss of power via control line 322. In response to detecting the loss of power, emergency battery 316 may provide microprocessor 302 with power via emergency hot wire 324 and emergency neutral wire 326. In response to receiving power via emergency hot wire 324 and emergency neutral wire 326, microprocessor 302 may activate emergency protocol 304.

Emergency protocol 304 may retrieve designation profile 351 from the memory location. Emergency protocol 304 may determine how much power to distribute to each of the designated fixtures, identified in designation profile 351. Emergency protocol 304 may instruct microprocessor 302 an amount of power to distribute to each of the designated fixtures. Microprocessor 302 may instruct LED driver 328 an amount power to distribute to each of the designated fixtures. LED driver 328 may distribute the power from emergency battery 316 based on the instructions received from microprocessor 302. Each designated fixture may receive the same amount of power. Each designated fixture may receive a different amount of power. The amount of power may be determined using power consumption metrics, distance metrics, location metrics or any other suitable metric. The amount of power may correspond to a light intensity desired from a fixture in an emergency mode. The light intensity may be selected by a user. The light intensity may be a preset lighting intensity.

One or more designation profiles may be stored in the memory location. Emergency protocol 304 may be programmed to retrieve a specific designation profile from the one or more designation profiles. Emergency protocol 304 may be programmed to retrieve more than one designation profile from the one or more designation profiles.

Power received from emergency battery 316 may be less than power transmitted from the line voltage. Power may be transmitted from emergency battery 316 for a predetermined amount of time. The predetermined amount of time may be included in the ranges listed in Table 2.

Figure 4:
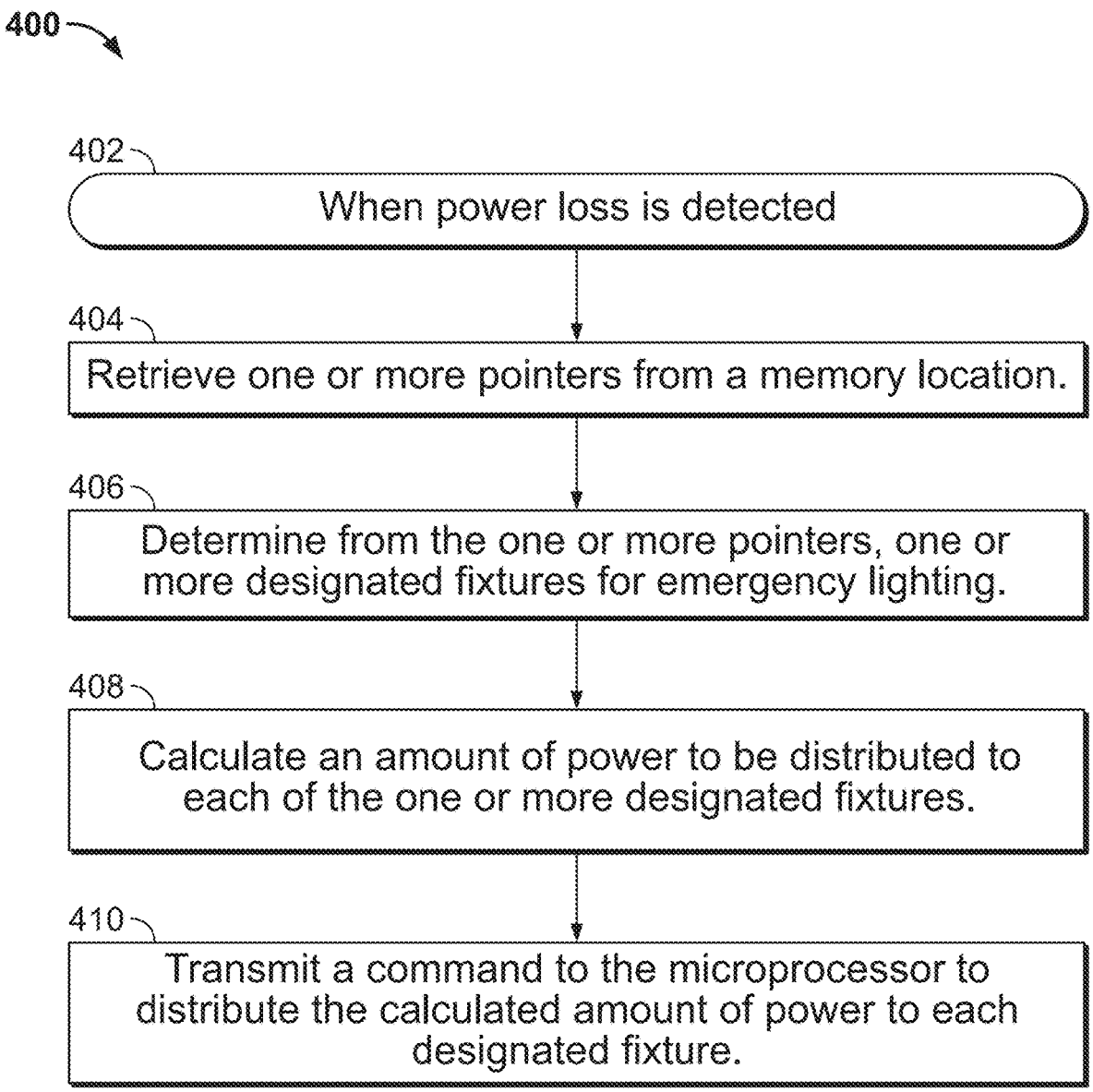
FIG. 4 shows illustrative diagram in accordance with the principles of the invention.

FIG. 4 shows illustrative steps of process 400 for implementing an emergency protocol such as emergency protocol 304. Emergency protocol may be activated in when a loss of power is detected at microprocessor 302. The loss of power may be detected by emergency battery 316.

At step 404, emergency protocol 304 may retrieve one or more pointers from the memory location. At step 406, emergency protocol 304 may determine from the one or more pointers, one or more designated fixtures for emergency lighting. Step 406 may include determining from the one or more pointers one or more fixture supports that the one or more fixtures are supported by. At step 408 emergency protocol 304 may calculate an amount of power to be distributed to each of the one or more identified designated fixtures. Emergency protocol 304 may calculate the amount of power based on one or more of user instructions, corresponding fixture specifications, environmental conditions, sensor outputs, preset algorithms or any other suitable factors. At step 410, emergency protocol 410 may transmit a command to microprocessor 302. The command may be a command to distribute the calculated amount of power to each identified designated fixture. The microprocessor may transmit the command to LED driver 328. LED driver 328 may provide the calculated amount of power to each identified designated fixture using power received by emergency battery 316.

Figure 5:
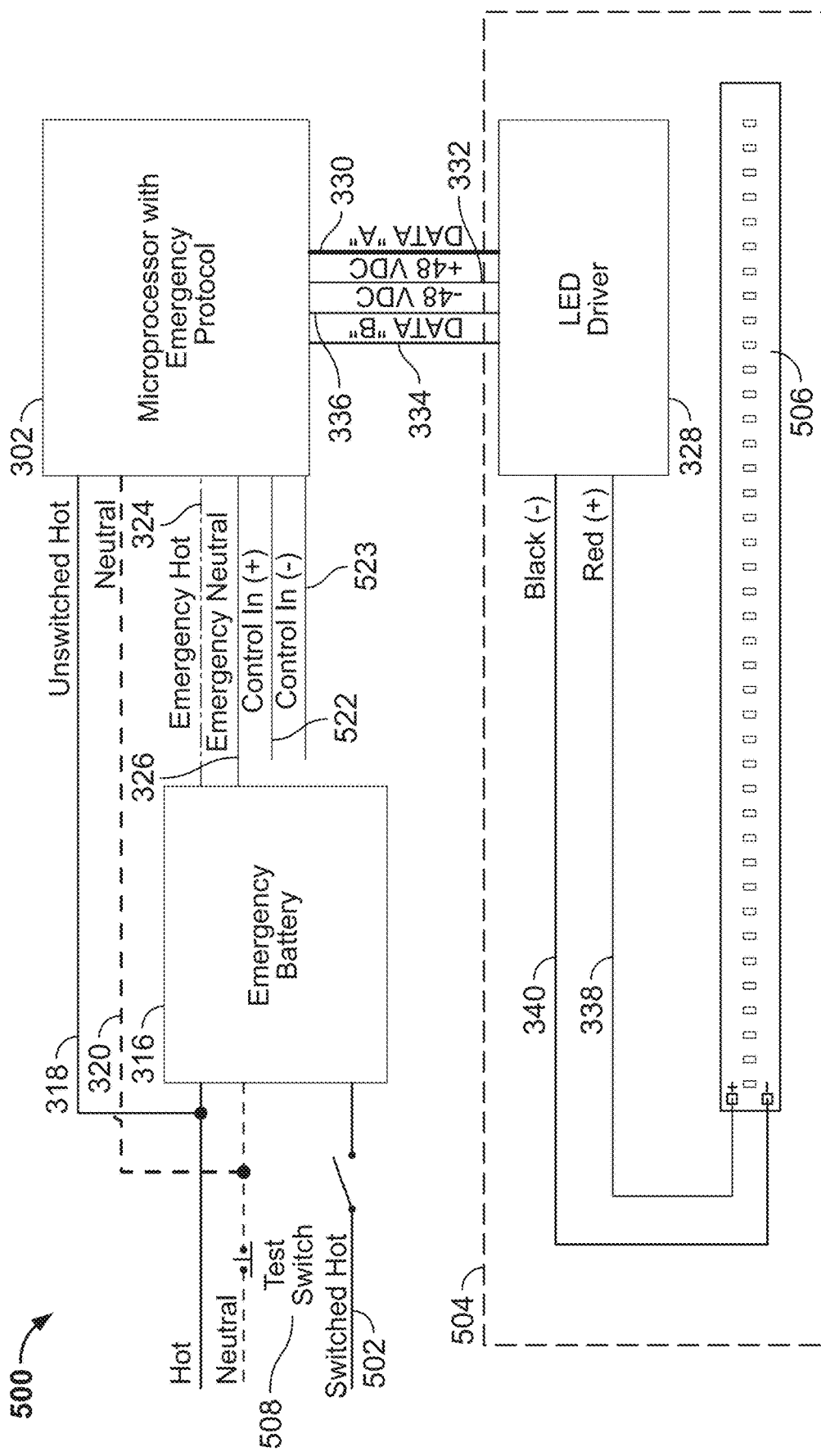
FIG. 5 shows schematically illustrative apparatus in accordance with the principles of the invention.

FIG. 5 shows emergency lighting assembly 500. Emergency lighting assembly 500 may include one or more features in common with emergency lighting assembly 300.

Fixture 504 may be selected by the user to provide light when there is a loss of power. Fixture 504 may be a designated fixture. Fixture 504 may include printed circuit board ("PCB") 506. PCB 506 may include an array of LEDs. PCB 506 receive power from LED driver 328. PCB 506 may receive power from LED driver 328 via power lines 338 and 340.

Emergency battery 316 may receive line power from hot wire 318 and neutral wire 320. Emergency battery 316 may use line power from hot wire 318 and neutral wire 320 to charge or recharge. Neutral wire 320 may include test switch 508. Test switch 508 may be used to test a level of charge of emergency battery 316. Test switch 508 may be used to test any suitable status of emergency battery 316. Emergency battery 316 may also receive power via switched hot wire 502. Switched hot wire 502 may include a switch.

Microprocessor 302 may receive two sources of line voltage input. One input may be received via hot wire 318 and neutral wire 320. One input may be received from emergency battery 316 via emergency hot wire 324 and emergency neutral wire 326. When power is lost from hot wire 318 and neutral wire 320, microprocessor 302 may activate emergency protocol 304. When power is lost from hot wire 318 and neutral wire 320, microprocessor 302 may source power from emergency battery 316.

When activated, emergency protocol 304 may automatically disable or turn off non-emergency LED drivers, such as LED driver 328. LED drivers designated as emergency drivers (not shown) may remain on at some specified power level compliant with emergency requirements.

End-user controls 322 and 323 may include lighting parameter controls controllable by a user. Lighting parameter controls may include a selected dimming level, a CCT, a color, any suitable lighting parameter, or any combination thereof. End-user controls 322 and 323 may be wired directly to the microprocessor 302. In an emergency condition, end-user controls 322 and 323 may be disabled by emergency protocol 304. In an emergency condition, end-user controls 322 and 323 may be overridden by emergency protocol 304.

Figure 6:
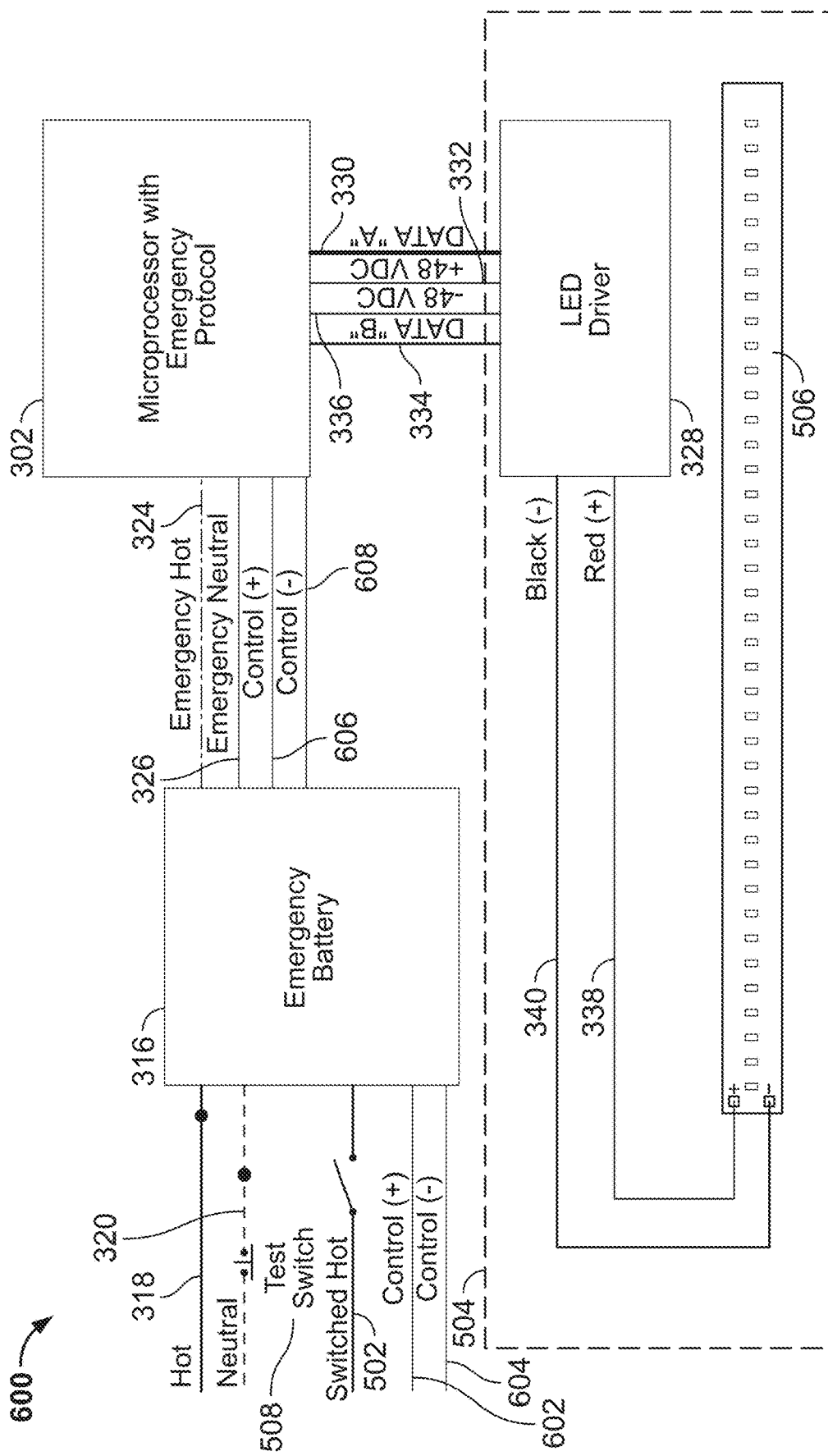
FIG. 6 shows schematically illustrative apparatus in accordance with the principles of the invention.

FIG. 6 shows illustrative emergency lighting assembly 600. Emergency lighting assembly 600 may include one or more features in common with emergency lighting assemblies 300 and 500.

Microprocessor 302 may receive one source of line voltage input from emergency battery 316 via emergency hot wire 324 and emergency neutral wire 326. Emergency battery 316 may receive input via hot wire 318 and neutral wire 326. When power is lost from hot wire 318 and neutral wire 320, emergency battery 316 may transmit emergency power to microprocessor 302. When power is lost from hot wire 318 and neutral wire 320, emergency battery 316 may transmit emergency power to microprocessor via emergency hot wire 324 and emergency neutral wire 326.

Emergency battery 316 may reduce the power load of microprocessor 302. Emergency battery 316 may reduce the power load of microprocessor 302 by overriding end-user controls 602 and 604. End-user controls 302 and 604 may have one or more features in common with end-user controls 322 and 323. Emergency battery 316 may transmit emergency dimming controls 606 and 608 to microprocessor 302. Emergency dimming controls 316 may be determined by emergency protocol 304. Emergency dimming controls 606 and 608 may be preset dimming controls.

Microprocessor 302 may update LED driver 328, downstream, to provide light at designated emergency levels based on dimming controls 606 and 608.

End-user controls 602 and 604 may be wired to the emergency battery 316. In a non-emergency condition, emergency battery 316 may transmit end user controls 602 and 604 to microprocessor 302. In an emergency condition, end-user controls 602 and 604 may be overridden by emergency dimming controls 606 and 608.

Figure 7:
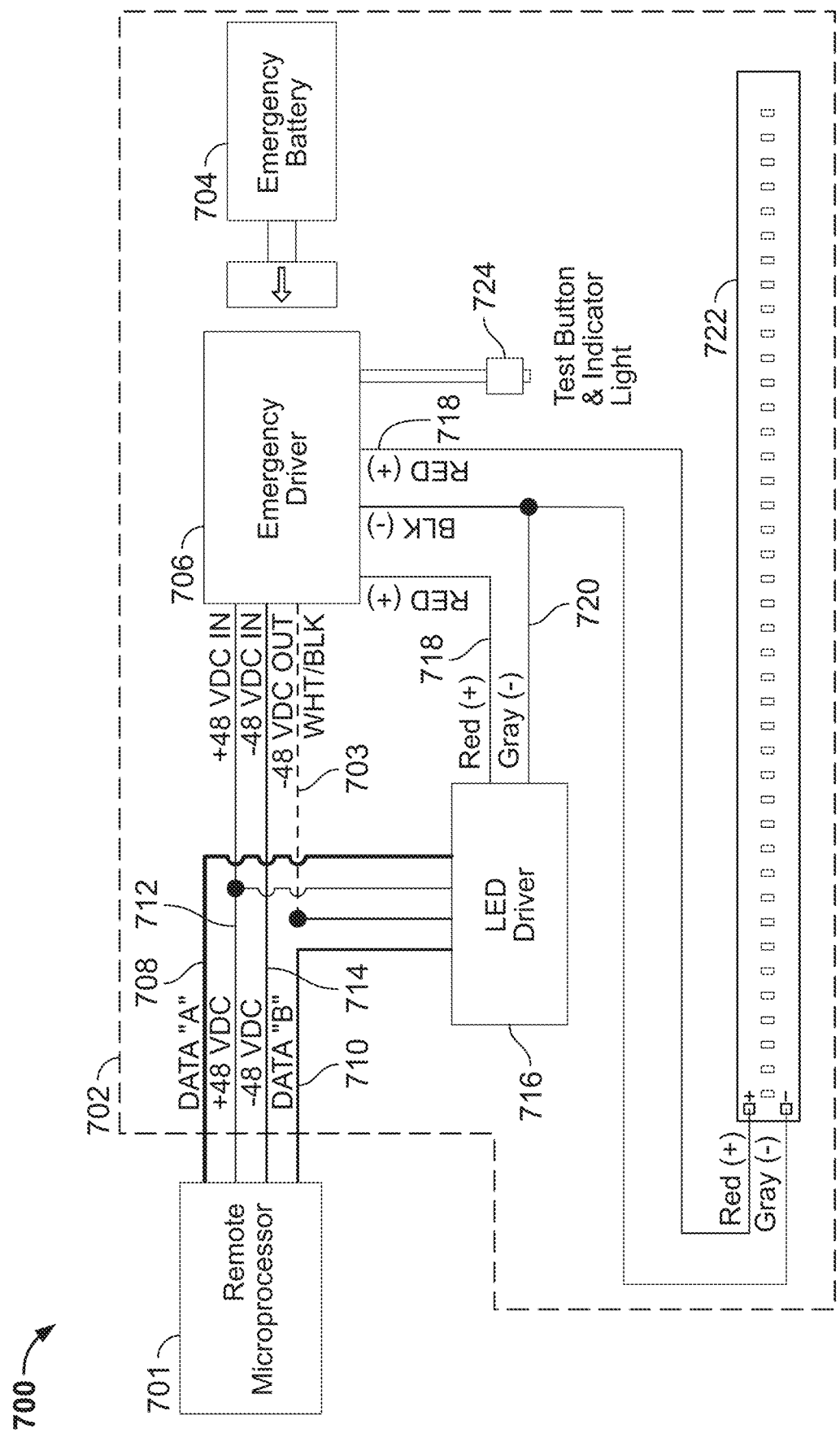
FIG. 7 shows schematically illustrative apparatus in accordance with the principles of the invention.

FIG. 7 shows illustrative emergency lighting assembly 700. Emergency lighting assembly 700 may have one or more features in common with one or more of emergency lighting assemblies 300, 500 and 600.

Emergency light fixture 702 may be configured to provide light when there is a loss of power. Emergency light fixture 702 be engaged with a fixture support, such as fixture supports 110 and 342.

Emergency light fixture 702 may include PCB 722. PCB 722 may include an array of LEDs.

Emergency driver 706 may receive power through power lines 712 and 714. Power may be transmitted through microprocessor 701. Emergency battery 704 may be connected to emergency driver 706. Emergency battery 704 may be charged through power received via power lines 712 and 714. Emergency driver 706 may include logic. The logic may determine when to charge emergency battery 704.

Emergency driver 706 may include test switch 724. Test switch 724 may include an indicator light. Test switch 724 may be used to test a level of charge of emergency battery 704. Test switch 724 may be used to test any suitable status of emergency battery 704.

In a non-emergency condition, power may be transmitted to LED driver 716 through microprocessor 701 via power line 712. Power may be transmitted to LED driver 716 through emergency driver 706 via power line 703. LED driver 716 may receive data from microprocessor 701. LED driver 716 may receive data from microprocessor 701 via data lines 708 and 710. Data may include an intensity level, a color, a CCT and any other suitable lighting setting. LED driver 716 may provide power to PCB 722 through power line 720. LED driver 716 may provide power to PCB 722 through power line 718. Power line 718 may pass through emergency driver 706.

In an emergency condition, there may be a loss of line power at microprocessor 701 When there is a loss of power, emergency battery 704 may provide power to emergency driver 706. When there is a loss of power, emergency battery 704 may supply power to PCB 722. Emergency battery 704 may supply power to PCB 722 via power lines 718 and 720.

Emergency driver 706 may include logic. The logic may reduce the light output of emergency light fixture 702 to designated emergency light levels. The designated emergency may include preset light levels. The designated emergency may include user selected light levels.

Figure 8:
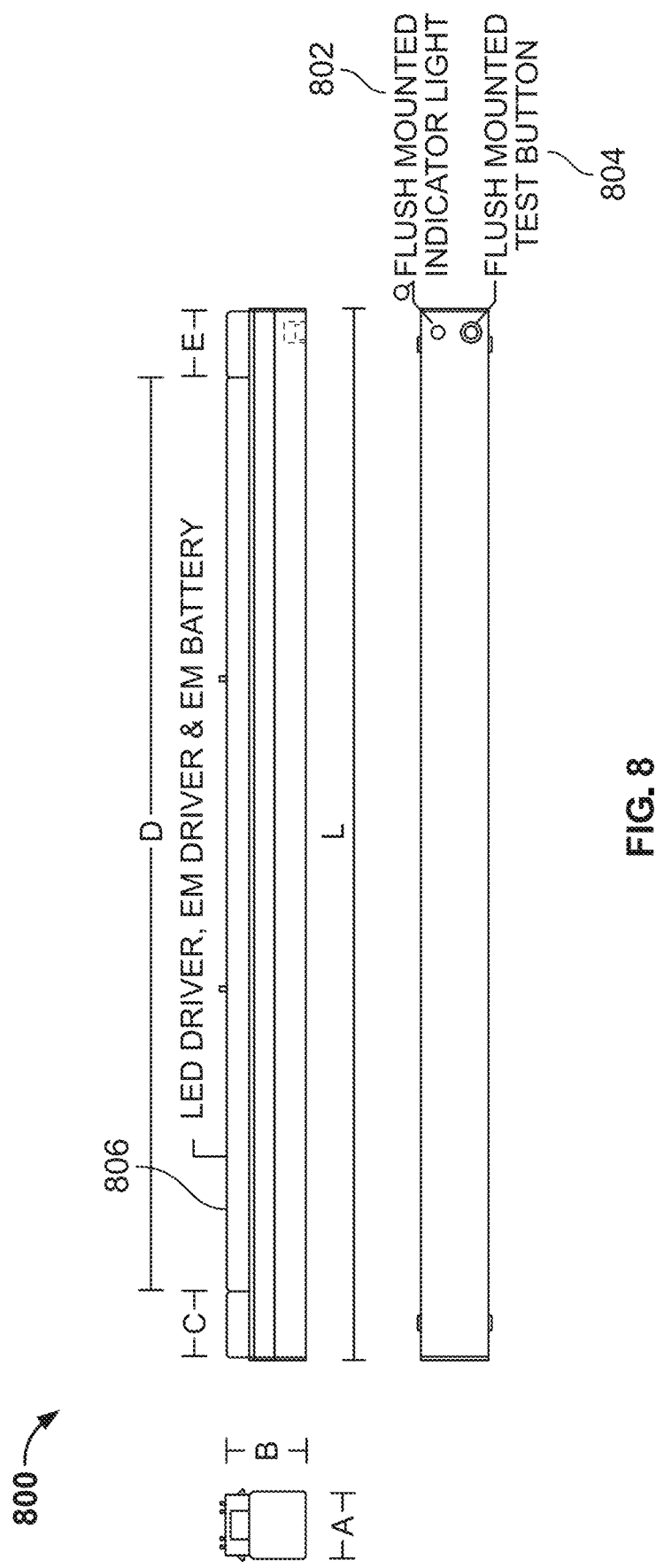
FIG. 8 shows illustrative apparatus in accordance with the principles of the invention.

FIG. 8 shows illustrative emergency lighting fixture 800. Emergency lighting fixture 800 may have one or more features in common with one or more of emergency lighting assemblies 300, 500, 600 and 700.

Emergency lighting fixture 800 may include circuitry unit 806. Circuitry unit 806 may include an LED driver, an emergency driver and an emergency battery.

Emergency lighting fixture 800 may include flush mounted indicator light 802. Flush mounted indicator light 802 may indicate a status of whether the emergency battery is charged. Emergency lighting fixture 800 may include flush mounted test button 804. Flush mounted test button 804 may be pressed to test the emergency battery.

Emergency lighting fixture 800 may include dimensions. Table 5 lists the dimensions and corresponding ranges.

TABLE 5

Illustrative dimensions and corresponding ranges.
Illustrative dimensions

| Dimension | Lower limit (inches) | Upper limit (inches) | Example (inches) |
|---|---|---|---|
| A | <0.1 | >20 | 1.5 |
| B | <0.1 | >20 | 1.75 |
| C | <0.1 | >20 | 1.5 |
| D | <0.1 | >60 | 20.75 and 44.75 |
| E | <0.1 | >20 | 1.5 |
| L | <0.1 | >100 | 24 and 48 |
| Other suitable dimension | Other suitable ranges | | Other suitable examples |

Figure 9:
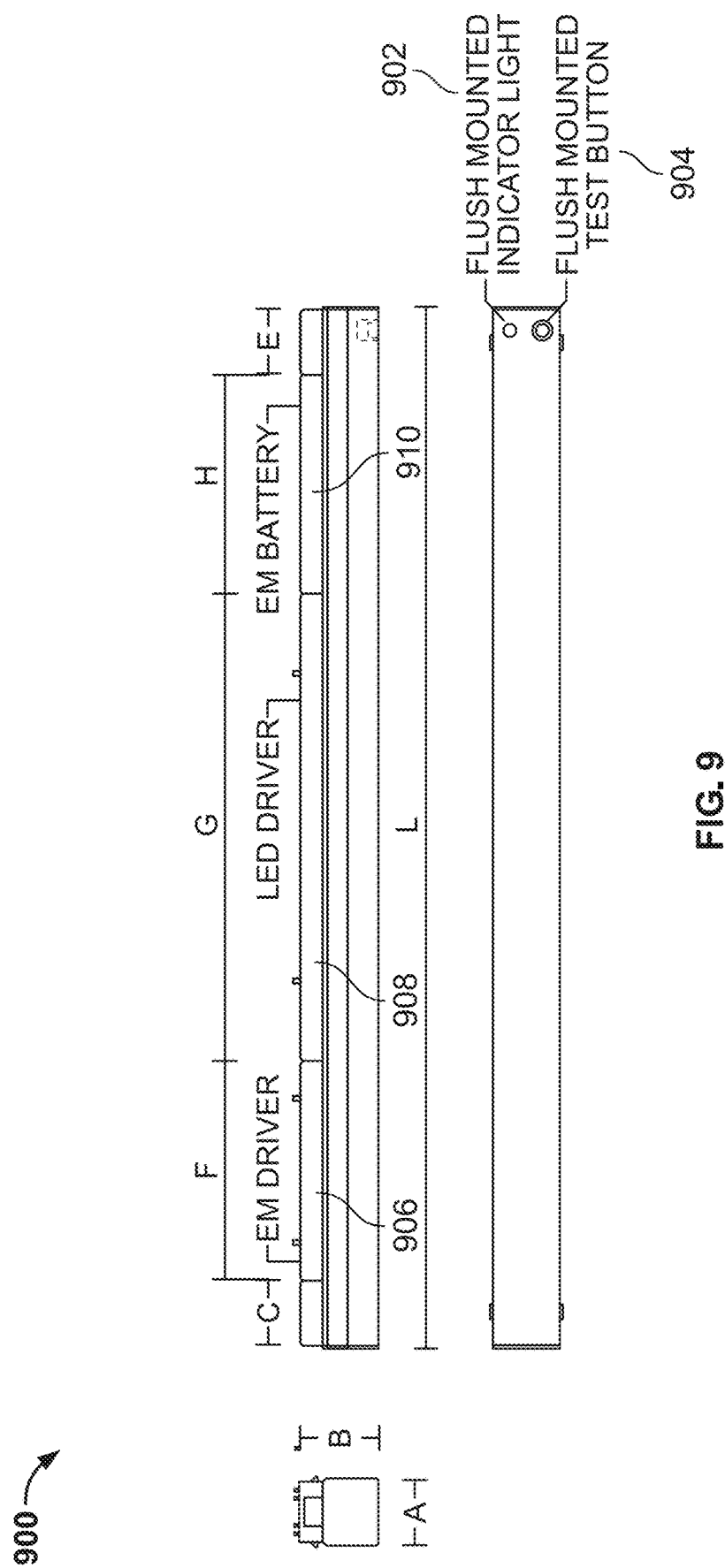
FIG. 9 shows illustrative apparatus in accordance with the principles of the invention.

FIG. 9 shows illustrative emergency lighting fixture 900. Emergency lighting fixture 900 may have one or more features in common with one or more of emergency lighting assemblies 300, 500, 600, 700 and 800.

Emergency lighting fixture 900 may include emergency driver 906, LED driver 908 and emergency battery 910.

Emergency lighting fixture 900 may include flush mounted indicator light 902. Flush mounted indicator light 902 may indicate a status of whether emergency battery 910 is charged. Emergency lighting fixture 900 may include flush mounted test button 904. Flush mounted test button 904 may be pressed to test emergency battery 910.

Emergency lighting fixture 900 may include dimensions. Table 6 lists the dimensions and corresponding ranges.

TABLE 6

Illustrative dimensions and corresponding ranges.
Illustrative dimensions

| Dimension | Lower limit (inches) | Upper limit (inches) | Example (inches) |
|---|---|---|---|
| A | <0.1 | >20 | 1.5 |
| B | <0.1 | >20 | 1.75 |
| C | <0.1 | >20 | 1.5 |
| F | <0.1 | >40 | 5 and 17 |
| G | <0.1 | >20 | 10.75 |
| H | <0.1 | >30 | 5 and 17 |
| E | <0.1 | >20 | 1.5 |
| L | <0.1 | >100 | 24 and 48 |
| Other suitable dimension | Other suitable ranges | | Other suitable examples |

Figure 10:
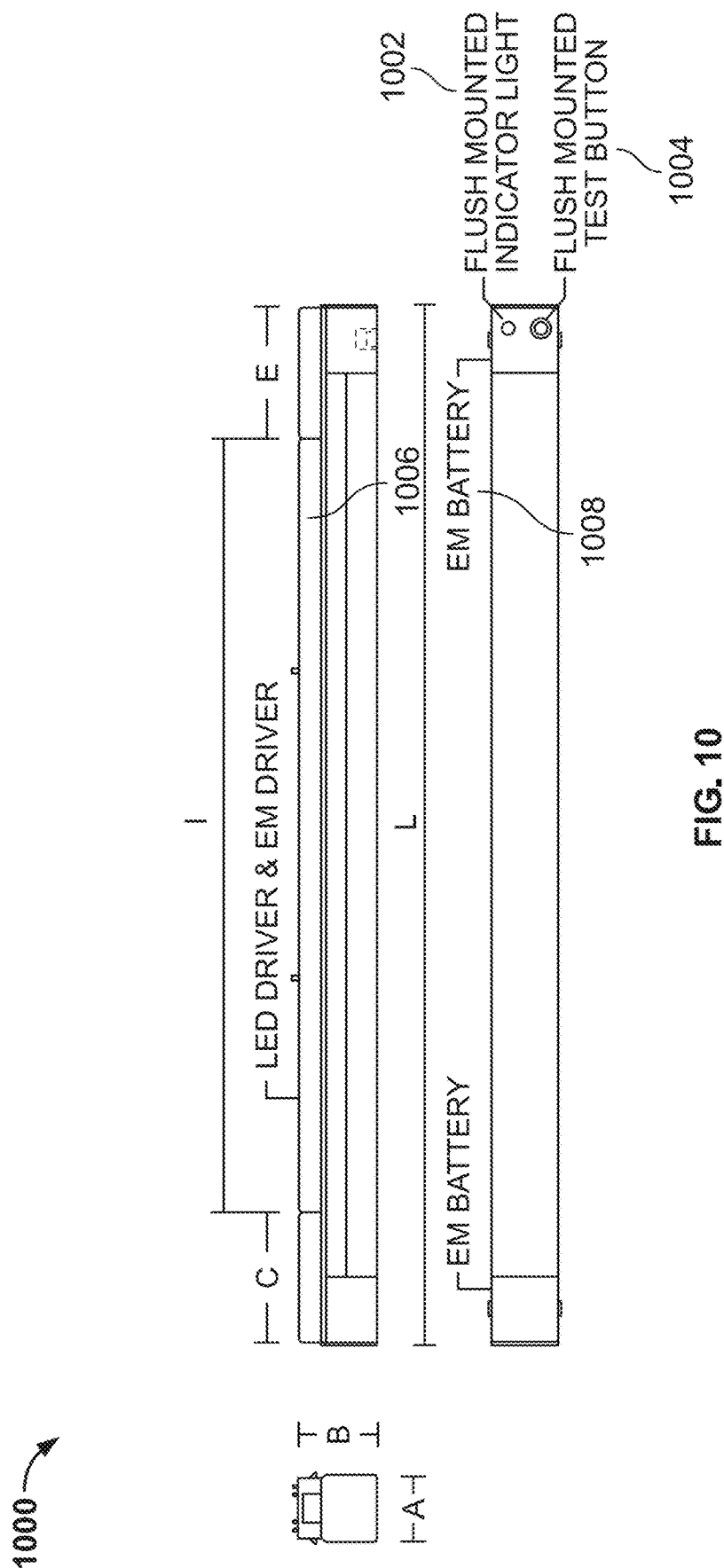
FIG. 10 shows illustrative apparatus in accordance with the principles of the invention.

FIG. 10 shows illustrative emergency lighting fixture 1000. Emergency lighting fixture 1000 may have one or more features in common with one or more of emergency lighting assemblies 300, 500, 600, 800, 700 and 900.

Emergency lighting fixture 1000 may include circuitry unit 1006. Circuitry unit 1006 may include an LED driver and emergency driver.

Emergency lighting fixture 1000 may include flush mounted indicator light 1002. Flush mounted indicator light 1002 may indicate a status of whether emergency battery 1008 is charged. Emergency lighting fixture 1000 may include flush mounted test button 1004. Flush mounted test button 1004 may be pressed to test emergency battery 1008.

Emergency lighting fixture 1000 may include dimensions. Table 7 lists the dimensions and corresponding ranges.

TABLE 7

Illustrative dimensions and corresponding ranges.
Illustrative dimensions

| Dimension | Lower limit (inches) | Upper limit (inches) | Example (inches) |
|---|---|---|---|
| A | <0.1 | >20 | 1.5 |
| B | <0.1 | >20 | 1.75 |
| C | <0.1 | >20 | 1.5 |
| I | <0.1 | >60 | 17.75 and 41.75 |
| E | <0.1 | >20 | 1.5 |
| L | <0.1 | >100 | 24 and 48 |
| Other suitable dimension | Other suitable ranges | | Other suitable examples |

Figure 11:
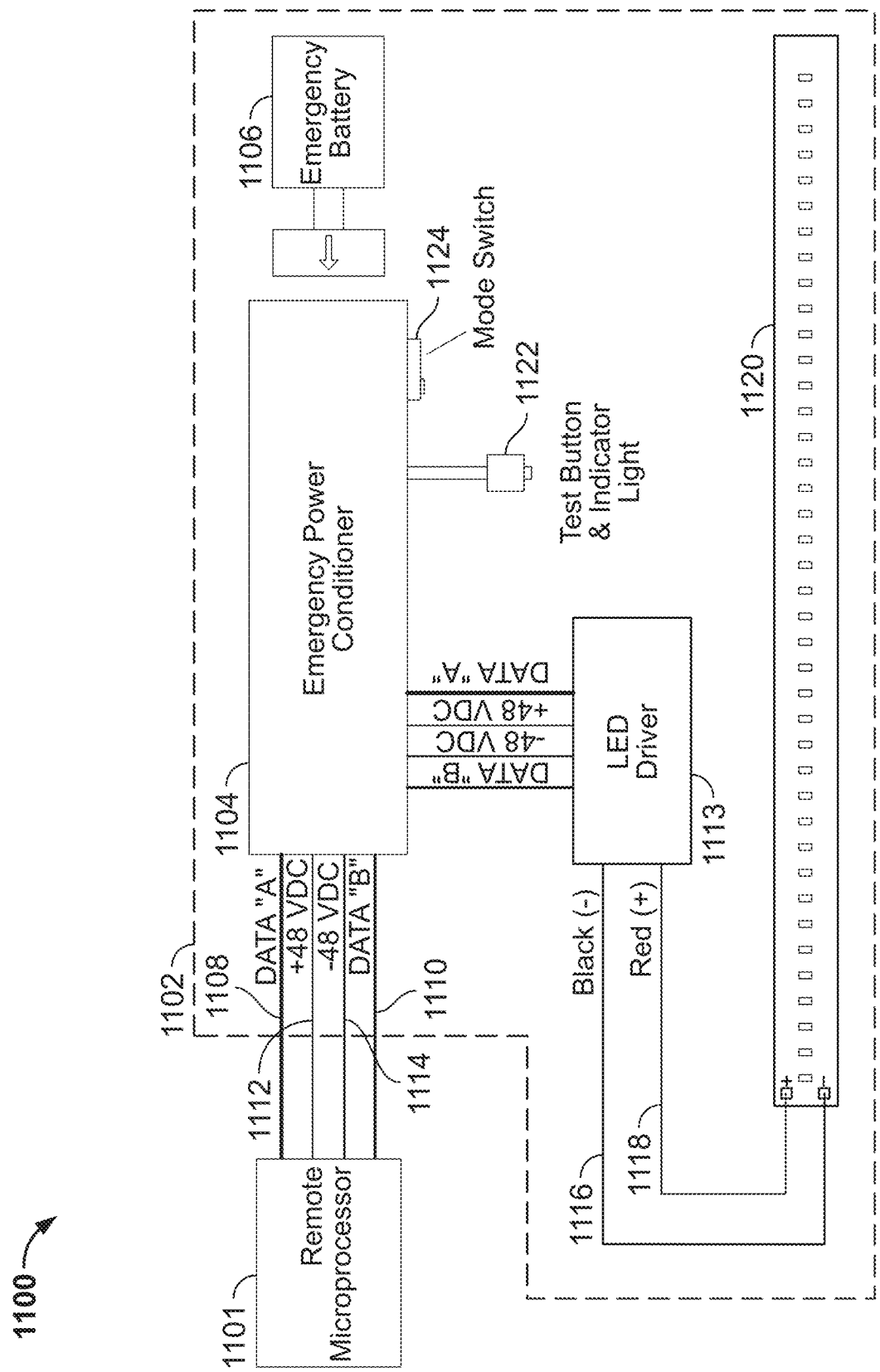
FIG. 11 shows schematically illustrative apparatus in accordance with the principles of the invention.

FIG. 11 shows illustrative emergency lighting assembly 1100. Emergency lighting assembly 1100 may have one or more features in common with one or more of emergency lighting assemblies 300, 500, 600, 800, 700, 900 and 1000.

Emergency light fixture 1102 may be configured to provide light when there is a loss of power. Emergency light fixture 1102 be engaged with a fixture support, such as fixture supports 110 and 342.

Emergency light fixture 1102 may include PCB 1120. PCB 1120 may include an array of LEDs.

Emergency power conditioner 1104 may receive power through power lines 1112 and 1114. Power may be transmitted through microprocessor 1101. Emergency battery 1106 may be connected to emergency power conditioner 1104. Emergency battery 1106 may be charged using power received via power lines 1112 and 1114. Emergency power conditioner 1104 may include logic. The logic may determine when to charge emergency battery 1106.

Emergency power conditioner 1104 may include test switch 1122. Test switch 1122 may include an indicator light. Test switch 1122 may be used to test a level of charge of emergency battery 1106. Test switch 1122 may be used to test any suitable status of emergency battery 1106.

Emergency light fixture 1102 may include mode switch 1124. Mode switch 1124 may enable emergency power conditioner 1104 to charge emergency battery 1106 when microprocessor 1101 has power. When a power loss is detected, mode switch 1124 may enable emergency power conditioner 1104 to provide power to LED driver 1113.

In a non-emergency condition, power may be transmitted to LED driver 1113 through microprocessor 1101 via power lines 1112 and 1114. LED driver 1113 may receive data from microprocessor 1101. LED driver 1113 may receive data from microprocessor 1101 via data lines 1108 and 1110. Data may include an intensity level, a color, a correlated color temperature CCT and any other suitable lighting setting. LED driver 1113 may provide power to PCB 1120 through power lines 1116 and 1118. In the non-emergency condition, emergency power conditioner 1104 may enable power transmission between microprocessor 1101 and LED driver 1113. Power may be transmitted through emergency power conditioner 1104. In the non-emergency condition, emergency power conditioner 1104 may enable data transmission between microprocessor 1101 and LED driver 1113. Data may be transmitted through emergency power conditioner 1104.

In an emergency condition, there may be a loss of line power at microprocessor 1101 When there is a loss of power, emergency battery 1106 may provide power to emergency power conditioner 1104. When there is a loss of power, emergency battery 1106 may supply power to PCB 1120 via power lines 1116 and 1118.

Figure 12:
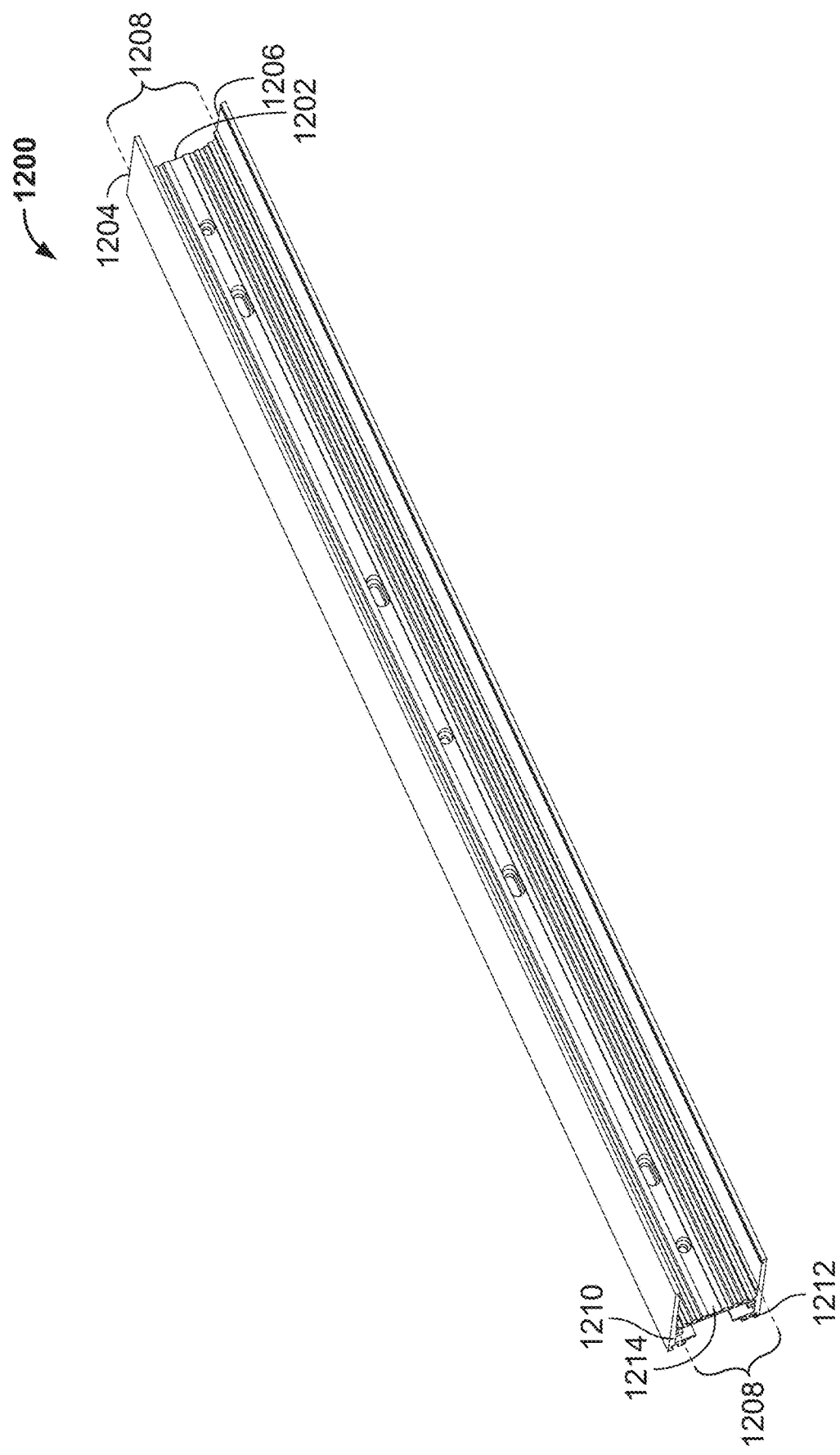
FIG. 12 shows illustrative apparatus in accordance with the principles of the invention.

FIG. 12 shows illustrative fixture support 1200. Fixture support 1200 may have one or more features in common with fixture support 110 (shown in FIG. 1). Fixture support 1200 may include spine 1202. Fixture support may include panel 1204. Fixture support may include panel 1206. Spine 1202, panel 1204 and panel 1206 may define fixture docking area 1208. Spine 1202, panel 1204 and panel 1206 may define connector slot 1210. Panel 1204 and panel 1206 may define fixture slot 1212. Fixtures such as 116 (shown in FIG. 1) may be docked in docking area 1208. Fixtures such as 118 (shown in FIG. 1) may be mounted in fixture slot 1212. Fixture docking tier 1214 may be disposed between panel 1204 and 1206.

Figure 13:
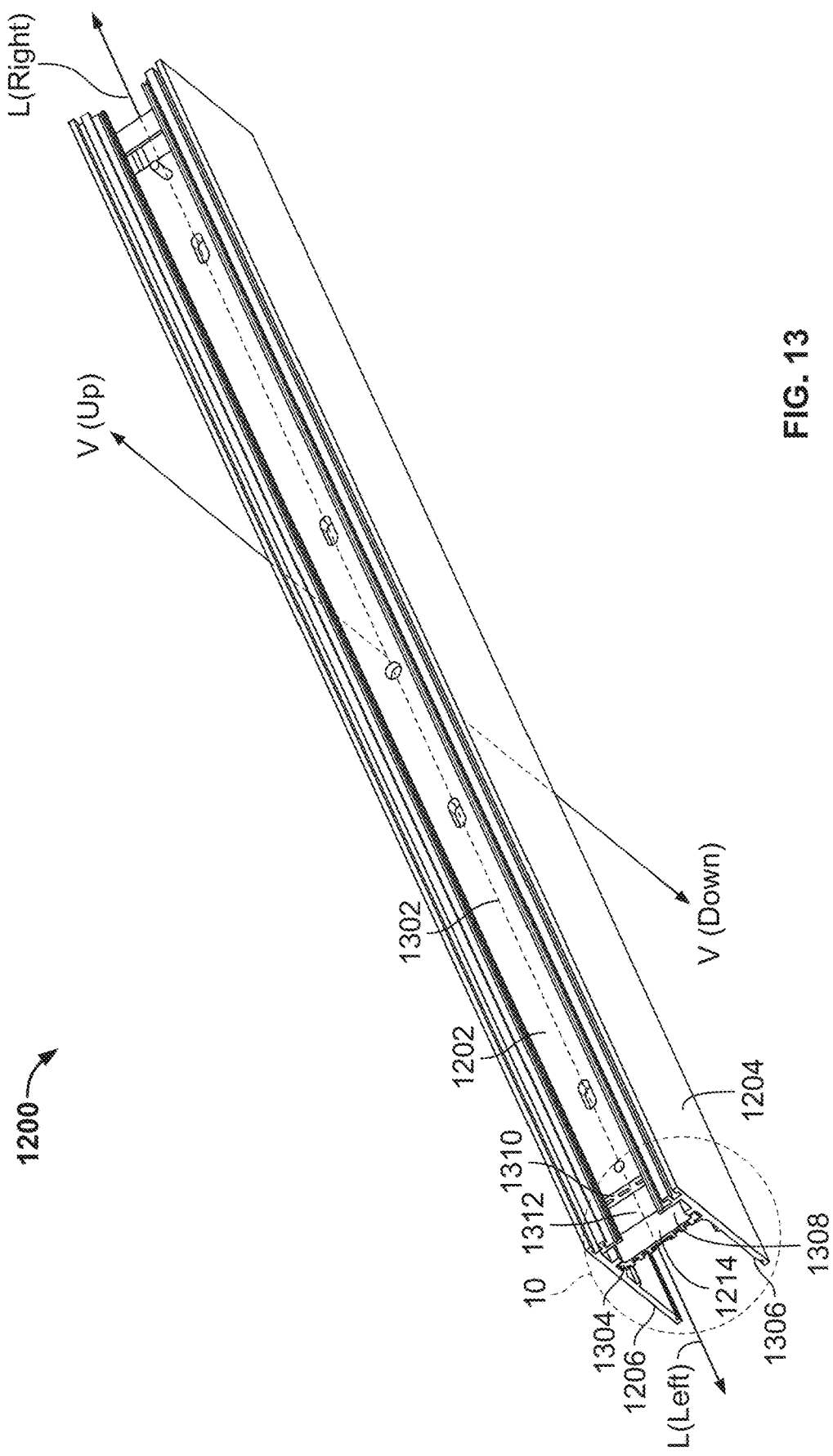
FIG. 13 shows illustrative apparatus in accordance with the principles of the invention.

FIG. 13 is a view of fixture support 1200 that is different from that shown in FIG. 12. FIG. 13 shows that spine 1202 may include bridge 1302. Bridge 1302 may span between panel 1204 and panel 1206. Fixture docking tier 1214 may extend longitudinally to the left along longitudinal direction L (left). End 1304 of tier 1214 may be flush with end 1306 of fixture support 1200. Tier 1214 may include platform 1308. Tier 1214 may include connection field 1312. Bridge 1302 may include abutment 1310. Abutment 1310 may be set back to the right along direction L (right) from end 1304. The directions L (left) and R (right) are for description of relative positions within fixture support 1200, and do not necessarily define an orientation of fixture support 1200 relative to any other frame of reference.

Figure 14:
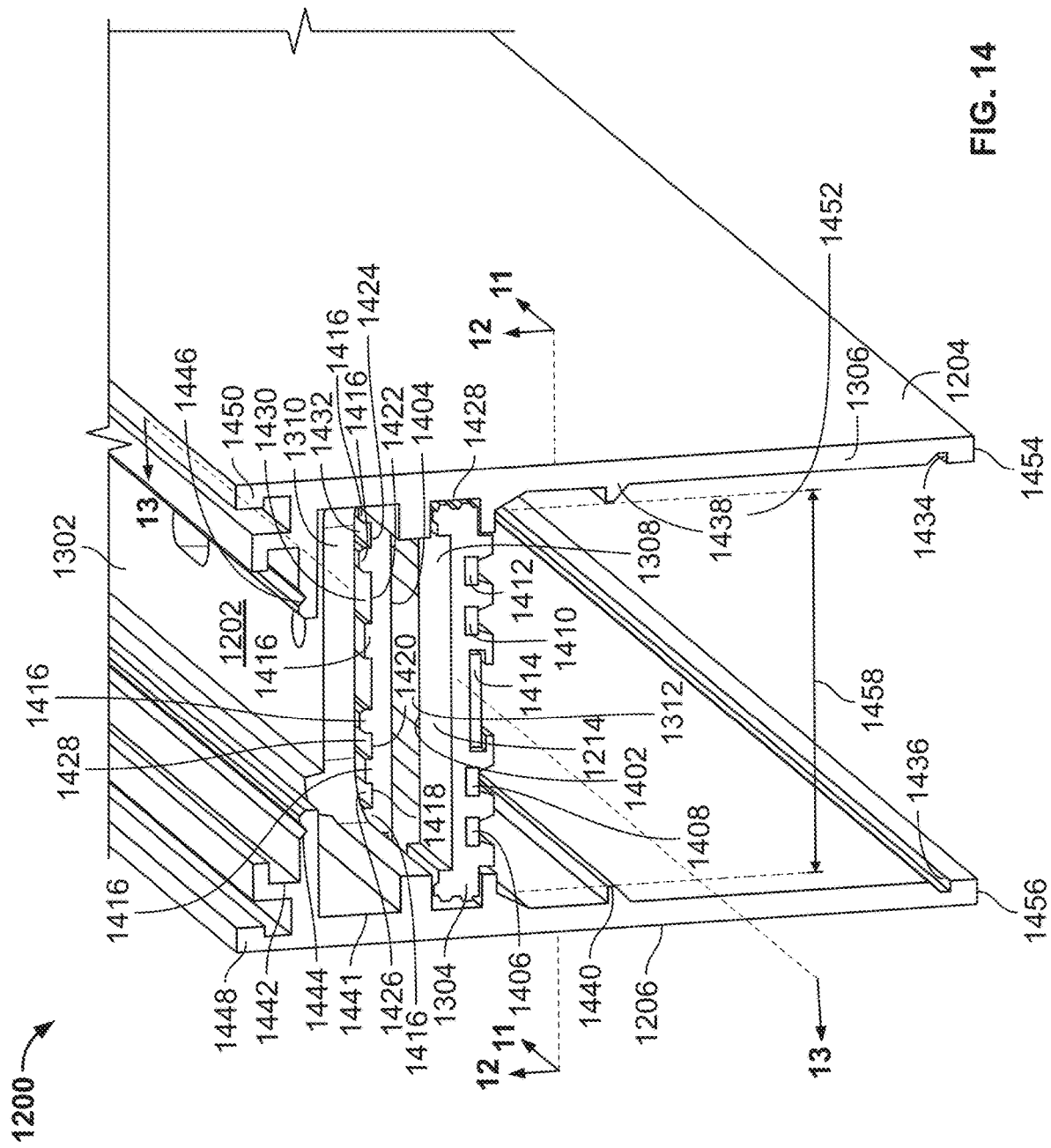
FIG. 14 shows illustrative apparatus in accordance with the principles of the invention.

FIG. 14 shows that platform 1308 may be disposed above, in direction V (up), from connection field 1312. The directions V (up) and V (down) are for description of relative positions within fixture support 1200, and do not necessarily define an orientation of fixture support 1200 relative to any other frame of reference. Platform 1308 may include abutment 1402 between platform 1308 and connection field 1312.

Tier 1214 may include back-plate 1404. Back-plate 1404 may extend above, and define a right limit of, connection field 1312. Connection field 1312 may provide access, from above tier 1214, to conductors in tier 1214. A connector bridging from another fixture support to fixture support 1200 may thus be made without interfering with fixture docking area 1208 below tier 1214.

Docking tier 1214 may include conductor 1406. Docking tier 1214 may include conductor 1408. Docking tier 1214 may include conductor 1410. Docking tier 1214 may include conductor 1412. A pair of the conductors, one positive and one negative, may be a communication bus that may transmit communications 210 (shown in FIG. 2). A pair of the conductors, one positive and one negative, may be a power rail that may transmit power from a transformer. Docking tier 1214 may include magnetic strip 1414. Back-plate 1404 may include ribs such 1416. Back-plate 1404 may include grooves 1418, 1420, 1422 and 1424. Together with bridge 1302, grooves 1418, 1420, 1422 and 1424 may form slots 1426, 1428, 1430 and 1432.

Panel 1204 may include groove 1434. Panel 1206 may include groove 1436. The grooves may engage with a complementary feature on a fixture such as 116 (shown in FIG. 1). Panel 1204 may include ridge 1438. Panel 1206 may include ridge 1440. The ridges may engage with a complementary feature on the fixture.

Docking tier 1214 may be disposed in slot 1428.

Fixture support 1200 may include slot 1441. Slot 1441 may be above tier 1214. Slot 1441 may receive a fixture support connector.

Fixture support 1200 may include slot 1442. Slot 1442 may be above slot 1441. Slot 1442 may include grooves 1444 and 1446. Slot 1442 may receive a fixture such as fixture 118 (shown in FIG. 1).

Fixture support 1200 may include overhangs 1448 and 1450.

Fixture support 1200 may define U-channel 1452. U-channel 1452 may be defined by docking tier 1214, panel 1204 and panel 1206. Panel 1204 may include distal edge 1454. Panel 1206 may include distal edge 1456. The fixture may be retractable within U-channel 1452. A lowest extreme of the fixture may be retracted above distal edge 1454. A lowest extreme of the fixture may be retracted above distal edge 1456. The lowest extreme may be a lip.

Fixture support 1214 may have docking area width 1458.

Figure 15:
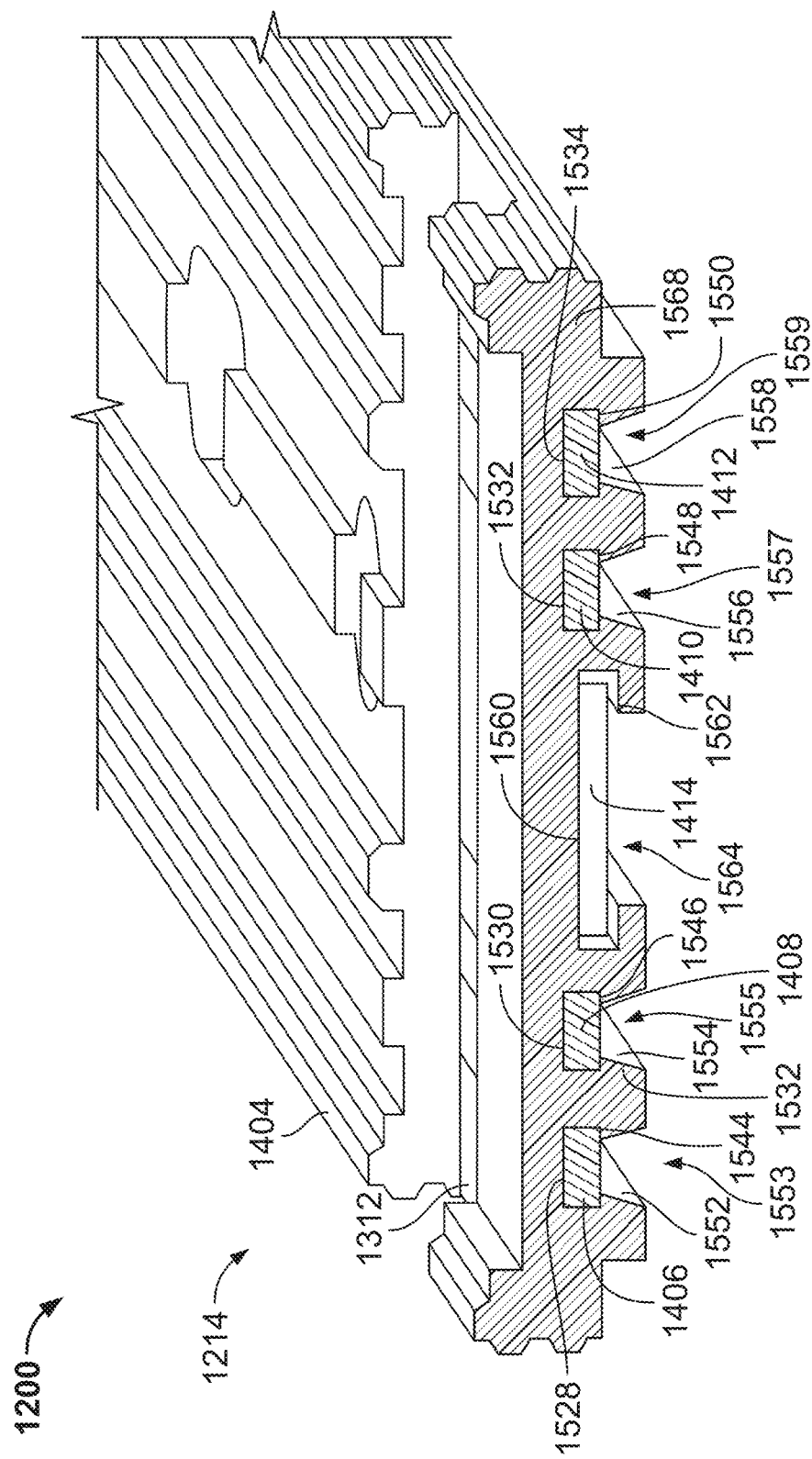
FIG. 15 shows illustrative apparatus in accordance with the principles of the invention.

FIG. 15 shows that conductors 1406, 1408, 1410 and 1412 may be disposed in grooves 1528, 1530, 1532 and 1534, respectively. Tier 1214 may include lips 1544, 1546, 1548 and 1550, corresponding to grooves 1528, 1530, 1532 and 1534. The lips may retain the conductors in tier 1214. Tier 1214 may include tapers 1553, 1555, 1557 and 1559, corresponding to grooves 1528, 1530, 1532 and 1534. A taper may guide a terminal from a fixture such as 316 toward a conductor. A taper may guide a terminal from a fixture such as 316 into electrical communication with a conductor. A taper may guide a terminal from a fixture such as 316 into direct contact with a conductor. Gaps 1552, 1554, 1556, and 1558 may provide access for direct contact between the fixture and a conductor.

Magnetic strip 1414 may be disposed in groove such as 1560. Tier 1214 may include lip 1562 for retaining magnetic strip 1414. Gap 1564 may expose magnetic strip 1414. Gap 1564 may have a magnetic permeability that is less than that of body 1568 of tier 1214. Gap 1564 may be a gap that includes no solid material.

Functions of electrical circuits, or parts thereof, disclosed herein may be incorporated into or combined with other electrical circuits, or parts thereof, disclosed herein, or with other suitable electrical circuits.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

Thus, apparatus, methods and algorithms for lighting have been provided. Persons skilled in the art will appreciate that the present invention may be practiced by other than the described embodiments, which are presented for purposes of illustration rather than of limitation.

What is claimed is:

1. Apparatus for emergency lighting comprising:
    a microprocessor configured to:
        power a plurality of fixtures configured to be supported in a fixture support;
        be electrically connected with a remote emergency battery via a control line; and
        in response to a loss of power at the microprocessor, activate an emergency lighting protocol configured to:
            retrieve a pointer to a designated fixture in the plurality of fixtures; and,
            using power received from the remote emergency battery, provide power to the designated fixture.

2. The apparatus of claim 1 wherein when a fixture from the plurality of fixtures is not the designated fixture, the fixture is not configured to be powered in response to the loss of power.

3. The apparatus of claim 1 further comprising, when the designated fixture is a first designated fixture:
    a second designated fixture;
wherein the emergency lighting protocol is further configured to retrieve a first pointer to the first designated fixture and a second pointer to the second designated fixture.

4. The apparatus of claim 3 wherein the first pointer and the second pointer are included in a single data structure.

5. The apparatus of claim 3 wherein the emergency lighting protocol is further configured to distribute the power received from the remote emergency battery between the first designated fixture and the second designated fixture.

6. The apparatus of claim 1 further comprising when the fixture support is a first fixture support:
    a second fixture support configured to support at least one of the plurality of fixtures;
wherein the microprocessor is further configured to power fixtures supported by the first fixture support and fixtures supported by the second fixture support.

7. The apparatus of claim 6 wherein the designated fixture is configured to be supported by the first fixture support.

8. The apparatus of claim 6 wherein the designated fixture is configured to be supported by the second fixture support.

9. The apparatus of claim 1 wherein the designated fixture is configured to be selected from the plurality of fixtures by a user selection via a software application.

10. The apparatus of claim 1 wherein the designated fixture is a preset designated fixture.

11. The apparatus of claim 9 wherein the designated fixture is configured to be undesignated by a second user selection.

12. The apparatus of claim 11 wherein a second designated fixture is configured to be selected from the plurality of fixtures by the second user selection.

13. The apparatus of claim 1 wherein the microprocessor is further configured to be disposed remote from the fixture support.

14. The apparatus of claim 1 wherein the microprocessor is further configured to be disposed in the designated fixture.

15. The apparatus of claim 1 wherein the control line is a 0-10V control line.

16. An emergency lighting fixture comprising at least one light emitting diode ("LED") light source, the emergency lighting fixture configured to:
be supported by a fixture support; and
receive from a microprocessor:
first power in a first state; and
second power in a second state;
wherein:
the first power is configured to be sourced from line voltage;
the second power is configured to be sourced from a remote emergency battery; and
the second state is configured to be activated, by the microprocessor, in response to a detection of a loss of line voltage at the microprocessor when the emergency light fixture is selected via a user selection to receive power in the second state.

17. The emergency lighting fixture of claim 16 wherein the microprocessor is disposed in the emergency lighting fixture.

18. The emergency lighting fixture of claim 16 wherein the microprocessor is disposed remote from the emergency lighting fixture.

19. The emergency lighting fixture of claim 16 wherein the second power is a lower power than the first power.

20. The emergency lighting fixture of claim 16 wherein the second state is configured to be activated via an emergency lighting protocol.

21. The emergency lighting fixture of claim 16 wherein the user selection is configured to be programmed via a software application.

22. An emergency lighting fixture comprising:
a light emitting diode ("LED") light source;
an LED driver configured to transmit power to the LED light source;
an emergency battery; and
an emergency driver that is configured to:
detect a loss of the power; and,
in response to the loss, transmit power from the emergency battery to the LED light source;
wherein the emergency lighting fixture is configured to be installed in a fixture support that is configured to transmit power and data to the LED driver.

23. The emergency lighting fixture of claim 22 wherein the emergency driver is different from the LED driver.

24. The emergency lighting fixture of claim 22 wherein power transmitted from the emergency driver is a lower power than power transmitted from LED driver.

25. The emergency lighting fixture of claim 22 wherein the emergency lighting fixture is configured not to be removeable from the fixture support.

26. The emergency lighting fixture of claim 22 wherein the emergency driver further includes a microcontroller configured to detect the loss of the power.

27. The emergency lighting fixture of claim 26 wherein the microcontroller is further configured to determine an amount of power to be transmitted from the emergency battery to the LED light source.

* * * * *